United States Patent
Okubo et al.

(10) Patent No.: US 11,437,631 B2
(45) Date of Patent: Sep. 6, 2022

(54) FUEL CELL SEPARATOR AND POWER GENERATION CELL

(71) Applicant: HONDA MOTOR CO., LTD., Tokyo (JP)

(72) Inventors: Takuro Okubo, Wako (JP); Suguru Ohmori, Wako (JP); Kentaro Ishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 166 days.

(21) Appl. No.: 17/101,521

(22) Filed: Nov. 23, 2020

(65) Prior Publication Data

US 2021/0159518 A1    May 27, 2021

(30) Foreign Application Priority Data

Nov. 25, 2019 (JP) .............................. JP2019-212148

(51) Int. Cl.
  *H01M 8/0258* (2016.01)
  *H01M 8/0276* (2016.01)
  *H01M 8/1004* (2016.01)

(52) U.S. Cl.
  CPC ....... *H01M 8/0258* (2013.01); *H01M 8/0276* (2013.01); *H01M 8/1004* (2013.01); *H01M 2250/20* (2013.01)

(58) Field of Classification Search
  CPC . H01M 8/0258; H01M 8/0276; H01M 8/1004
  USPC ......................................................... 429/482
  See application file for complete search history.

(56) References Cited

U.S. PATENT DOCUMENTS

| | | | |
|---|---|---|---|
| 7,718,293 B2 | 5/2010 | Ströbel et al. | |
| 2005/0035560 A1* | 2/2005 | Segawa | F16J 15/106 277/634 |
| 2018/0219233 A1* | 8/2018 | Ishida | H01M 8/0258 |
| 2019/0296370 A1* | 9/2019 | Koga | H01M 8/0271 |
| 2019/0319280 A1* | 10/2019 | Ohmori | H01M 8/2404 |

* cited by examiner

*Primary Examiner* — James M Erwin
(74) *Attorney, Agent, or Firm* — Carrier Blackman & Associates, P.C.; Joseph P. Carrier; William D. Blackman

(57) ABSTRACT

A passage bead seal of a fuel cell joint separator includes a straight portion and curved portions. An oxygen-containing gas bridge section connecting the inside and the outside of a portion surrounded by a passage bead seal includes inner tunnels and outer tunnels coupled to an inner side wall and an outer side wall of a straight portion, and protruding in a separator thickness direction. The tunnel height is determined to be smaller than the bead seal height by not less than a predetermined value in a manner that a line pressure applied by a compression load to a front end surface of the straight portion becomes the same as a line pressure applied by the compression load to a front end surface of the curved portion.

6 Claims, 11 Drawing Sheets

FUEL CELL SEPARATOR AND POWER GENERATION CELL

CROSS-REFERENCE TO RELATED APPLICATION

This application is based upon and claims the benefit of priority from Japanese Patent Application No. 2019-212148 filed on Nov. 25, 2019, the contents of which are incorporated herein by reference.

BACKGROUND OF THE INVENTION

Field of the Invention

The present invention relates to a fuel cell separator and a power generation cell including a passage bead seal surrounding a fluid passage.

Description of the Related Art

For example, a solid polymer electrolyte fuel cell includes a membrane electrode assembly (MEA) including an anode provided on one surface of an electrolyte membrane, and a cathode provided on the other surface of the electrolyte membrane. The electrolyte membrane is a solid polymer electrolyte membrane. The membrane electrode assembly is sandwiched between separators (bipolar plates) to form a power generation cells, and a plurality of power generation cells are stacked together to form a stack body. End plates are stacked on both ends of the stack body in the stacking direction to form a fuel cell stack. The end plates hold the plurality of power generation cells, etc. that are stacked together, and apply a compression load (stacking load) to the stack boy in a stacking direction.

In some cases, metal separators are used in this type of the fuel cell stack. In such cases, seal members are provided to prevent leakage of fluid such as reactant gasses (an oxygen-containing gas and a fuel gas) and a coolant. Elastic rubber seals, such as fluorine and silicone rubbers are used as the seal members, and the cost of the separator is pushed up due to the use of the seal members. In this regard, for example, as disclosed in the specification of U.S. Pat. No. 7,718,293, structure where a protruding bead seal is formed in the separator instead of the elastic rubber seal has been adopted.

SUMMARY OF THE INVENTION

In a stack body, in order to supply and discharge an oxygen-containing gas, a fuel gas, and a coolant (also collectively referred to as fluid) to/from each of power generation cells, fluid passages penetrate through metal separators in a stacking direction, outside the power generation area of the power generation cells. The fluid passages are sealed by passage bead seals surrounding the fluid passages. In this manner, leakage of the fluid is prevented.

Specifically, the stack body includes a contact section which contacts a front end surface of the passage bead seal in a protruding direction in which the passage bead seal protrudes. A front end surface of the passage bead seal contacts the contact section of the stack body, and the passage bead seal is elastically deformed by the above compression load. Thus, a line pressure having a predetermined strength (the average value of the surface pressure in a direction in the passage bead seal extends) is applied to the front end surface. In this manner, the desired seal performance of the passage bead seal is achieved. As a result, the inside and the outside of the portion surrounded by the passage bead seal is sealed.

As a passage of the fluid between the power generation area of the power generation cell and the fluid passages, the separator is provided with tunnels forming connection channels connecting the inside and the outside of the portion surrounded by the passage bead seal. The rigidity of the coupling portion coupled to the tunnel of the passage bead seal is high in comparison with the portion which is not coupled to the tunnels, and the coupling portion is not deformed easily. Therefore, the line pressure applied to the front end surface of the passage bed seal tends to be large locally at the coupling portion. Therefore, the line pressure added to the front end surface of the passage bead seal may vary, and if there is any portion of the front end surface to which a line pressure having a predetermined strength is not applied, it becomes difficult to achieve the desired seal performance by the passage bead seal.

An object of the present invention is to provide a fuel cell separator and a power generation cell which make it possible to achieve the desired seal performance of the passage bead seal.

According to an aspect of the present invention, a fuel cell separator is provided. The fuel cell separator includes a fluid flow field as a passage of fluid including an oxygen-containing gas, a fuel gas, or a coolant in a separator surface direction, a fluid passage connected to the fluid flow field and penetrating the fuel cell separator in a separator thickness direction, and a passage bead seal formed around the fluid passage, and protruding in the separator thickness direction, wherein the fuel cell separator is stacked on a membrane electrode assembly, and a compression load is applied to the fuel cell separator in the stacking direction, the fuel cell separator further includes a bridge section configured to connect inside and outside of a portion surrounded by the passage bead seal, as viewed in the separator thickness direction, the passage bead seal includes a straight portion where the bridge section is disposed, and curved portions provided on both sides of the straight portion in a peripheral direction of the passage bead seal, the bridge section includes a tunnel coupled to a side wall of the straight portion, and protruding in the separator thickness direction, and a protruding height of the tunnel by which the tunnel protrudes from a reference surface is determined to be smaller than a protruding height of the passage bead seal by which the passage bead seal protrudes from the reference surface, by not less than a predetermined value, in a manner that a line pressure applied by the compression load to a front end surface of the straight portion in a protruding direction becomes same as a line pressure applied by the compression load to a front end surface of the curved portion in a protruding direction.

According to another aspect of the present invention, a power generation cell including the fuel cell separator and the membrane electrode assembly is provided.

In the fuel cell separator, the protruding height of the tunnel by which the tunnel protrudes from the reference surface is determined to be smaller than the protruding height of the passage bead seal by which the passage bead seal protrudes from the reference surface, by not less than a predetermined value in a manner that the line pressure applied by the compression load to the front end surface of the straight portion in the protruding direction becomes the same as the line pressure applied by the compression load to the front end surface of the curved portion in the protruding direction. The line pressure herein means an average value of the line pressure applied to the front end surface, per unit length in the direction in which the passage bead seal extends. Further, in the case where the line pressure applied to the front end surface of the straight portion is within the range between 80% and 120% of the line pressure applied to the front end surface of the curved portion, it is considered that the line pressure applied to the front end surface of the straight portion and the line pressure applied to the front end surface of the curved portion are the "same". Further, the "predetermined value" herein can be determined, e.g., based on the material, the shape, and the size of the fuel cell joint separator, and the shapes, the sizes, and the layout of the passage bead seals, the tunnels, and the fluid passages, and can be calculated in advance by simulations, etc.

In the passage bead seal, though the straight portion is coupled to the tunnel, it is possible to avoid the line pressure applied to the front end surface of the straight portion to becomes locally higher than the line pressure applied to the portion of the front end surface which is not coupled to the tunnel such as the curved portion. In the structure, it is possible to apply the line pressure to the front end surface of the passage bead seal uniformly.

Further, in this case, since increase in the rigidity in the straight portion of the passage bead seal is suppressed, it becomes possible to suitably deform the straight portion elastically in correspondence with the compression load, and suppress occurrence of bucking of the straight portion. In this manner, it is possible to suitably maintain the state where the line pressure having the predetermined strength is applied to the front end surface of the passage bead seal.

In view of the above, in the present invention, it is possible to suitably achieve the desired seal performance by the passage bead seal.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
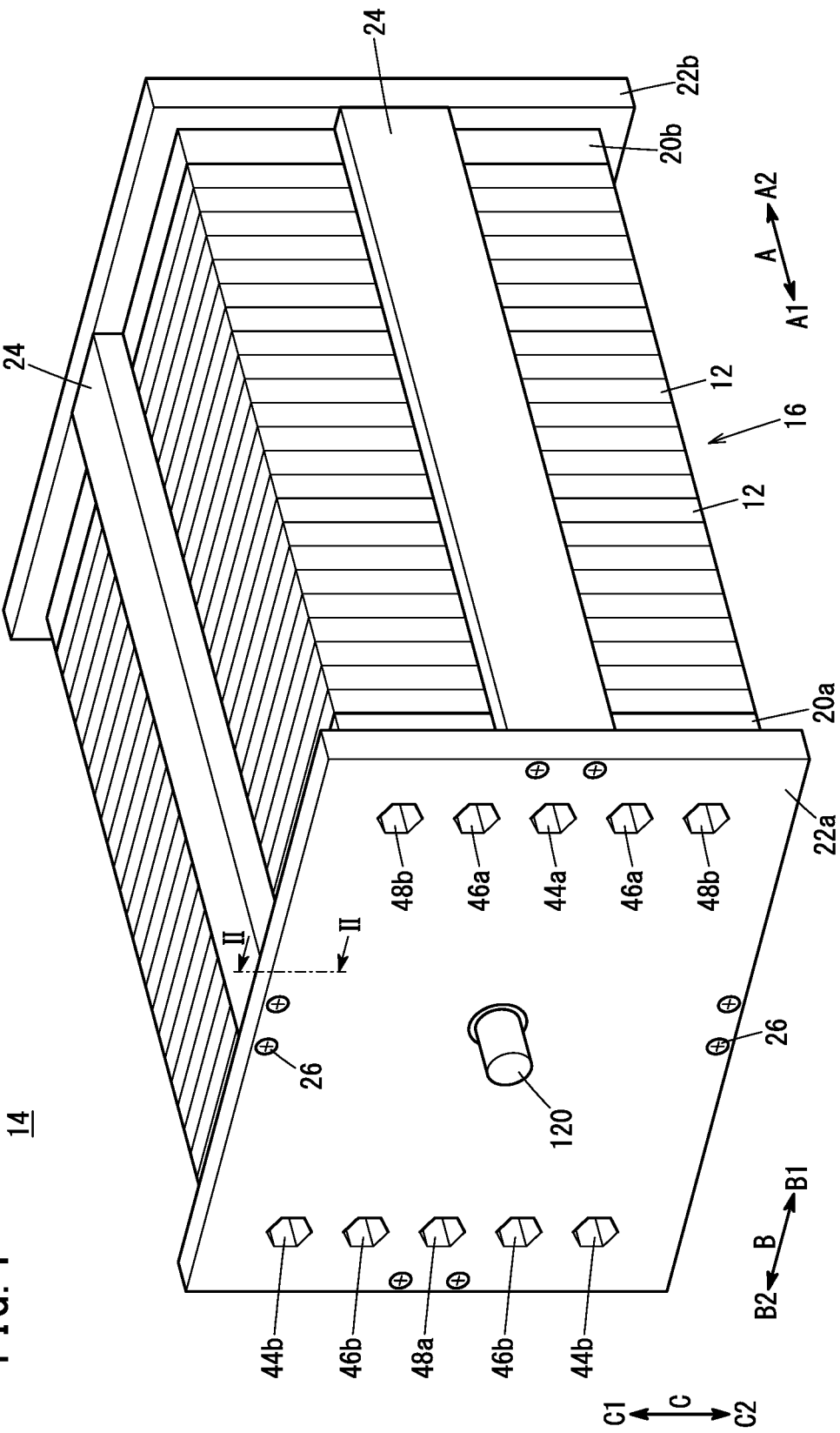
FIG. 1 is a perspective view showing a fuel cell stack.

A preferred embodiment of a fuel cell separator and a power generation cell according to the present invention will be described with reference to accompanying drawings. In the drawings mentioned below, the constituent elements which have the same or similar functions and which offer the same or similar advantages are labeled with the same reference numerals, and description of such constituent elements may not be repeated.

Figure 2:
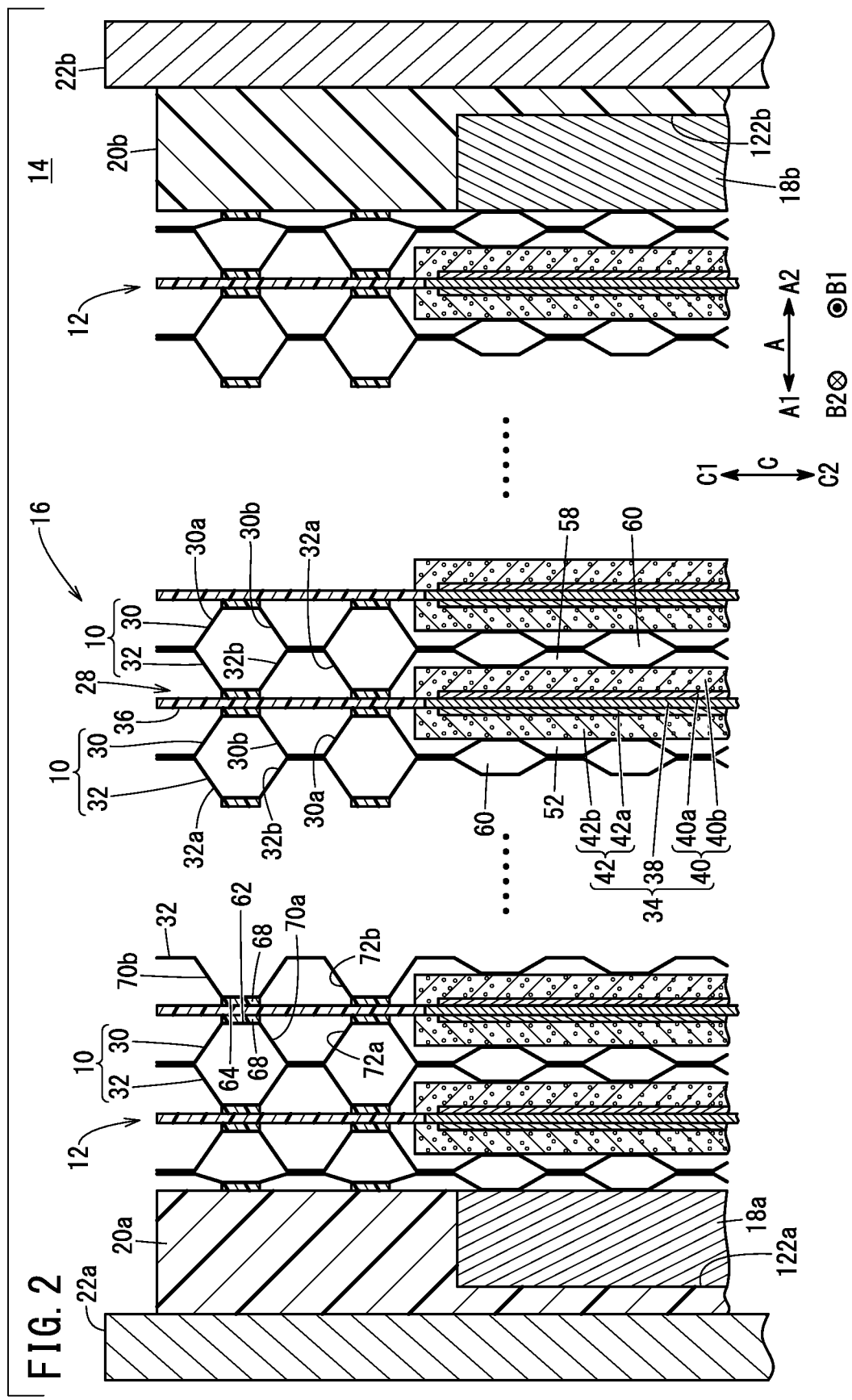
FIG. 2 is a cross sectional view taken along a line II-II indicated by arrows in FIG. 1.
Figure 3:
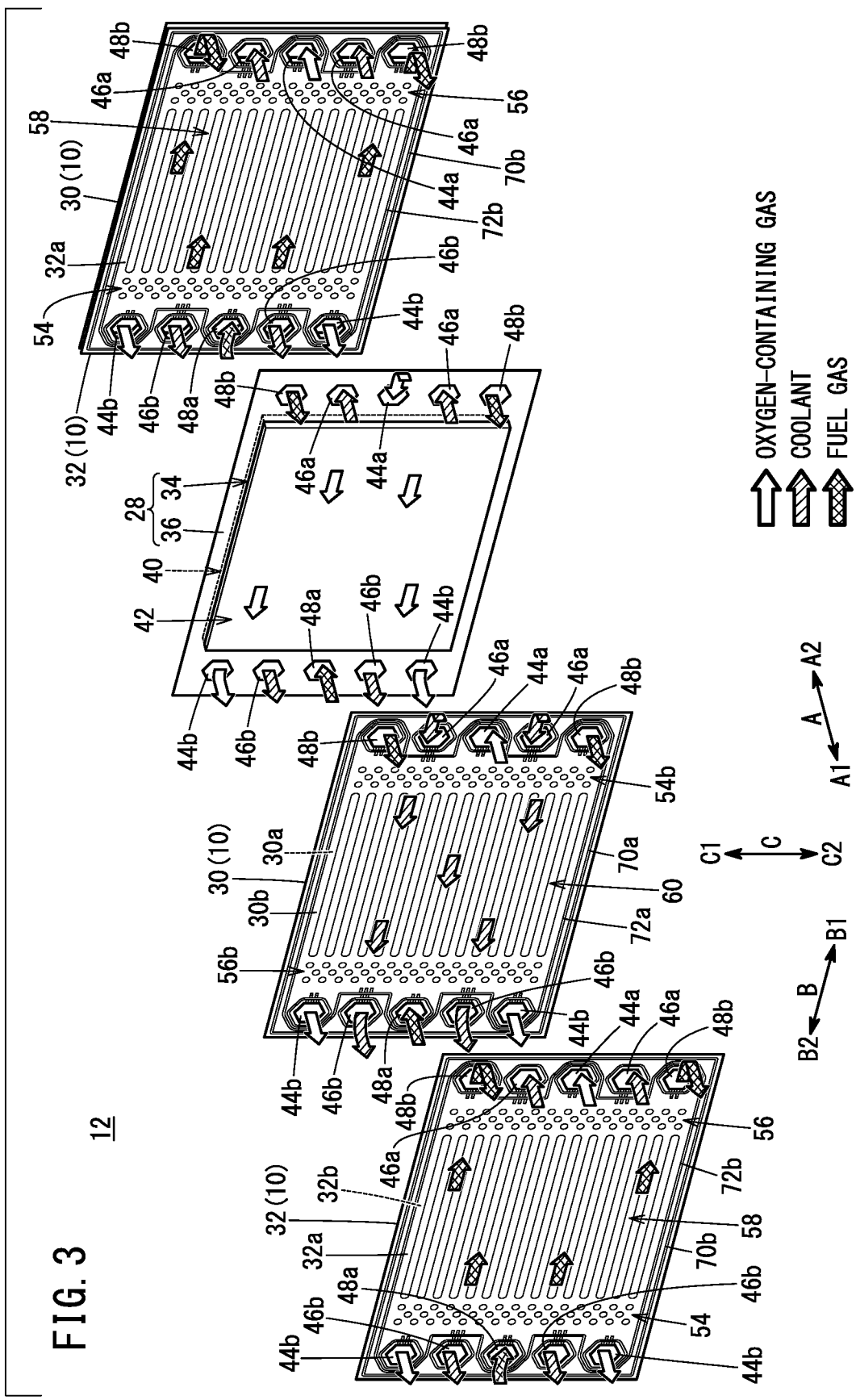
FIG. 3 is an exploded perspective views showing a power generation cell.

As shown in FIGS. 2 and 3, a fuel cell joint separator 10 (fuel cell separator) according to the embodiment of the present invention forms a power generation cell 12 (unit fuel cell). As shown in FIGS. 1 and 2, a fuel cell stack 14 (fuel cell) includes a stack body 16 formed by stacking a plurality of the power generation cells 12 together in a horizontal direction (indicated by an arrow A) or in the gravity direction (indicated by an arrow C). For example, the fuel cell stack 14 is mounted in a fuel cell vehicle such as a fuel cell electric automobile, etc.

As shown in FIGS. 1 and 2, at one end of the stack body 16 in the stacking direction (end in the direction indicated by an arrow A1), a terminal plate 18a is provided (FIG. 2). An insulator 20a is provided outside the terminal plate 18a, and an end plate 22a is provided outside the insulator 20a. At the other end of the stack body 16 in the stacking direction (end in the direction indicated by the arrow A2), a terminal plate 18b (FIG. 2) is provided. An insulator 20b is provided outside the terminal plate 18b, and an end plate 22b is provided outside the insulator 20b.

As shown in FIG. 1, each of the end plates 22a, 22b has a rectangular shape elongated in a lateral direction (or elongated in a longitudinal direction). Coupling bars 24 are disposed between the sides of the end plates 22a, 22b. The coupling bars 24 extend in the stacking direction (indicated by the arrow A). Both ends of the coupling bars 24 are fixed to inner surfaces of the end plates 22a, 22b using bolts 26. Therefore, a compression load having a predetermined strength is (hereinafter simply also referred to as the "compression load") is applied to the plurality of power generation cells 12 held between the end plates 22a, 22b. It should be noted that the fuel cell stack 14 may include a casing including the end plates 22a, 22b, and the stack body 16 may be placed in the casing.

As shown in FIGS. 2 and 3, in the embodiment of present invention, each of the power generation cells 12 includes a resin frame equipped MEA 28, and a first separator 30 and a second separator 32 sandwiching the resin frame equipped MEA 28. The outer peripheral portions of the first separator 30 and the second separator 32 are joined together by welding, brazing, crimping, etc. to form a fuel cell joint separator 10. The fuel cell joint separator 10 (the first separator 30 and the second separator 32) is formed by press forming of a metal thin plate to have a corrugated shape in cross section.

For example, the metal plate is a steel plate, a stainless steel plate, an aluminum plate, a plated steel plate, or a metal plate having an anti-corrosive surface by surface treatment.

The resin frame equipped MEA 28 includes a membrane electrode assembly (MEA) 34, and a resin frame member 36 provided around the outer periphery of the membrane electrode assembly 34. As shown in FIG. 2, the membrane electrode assembly 34 includes an electrolyte membrane 38, an anode 40 provided on one surface (surface on the side indicated by the arrow A2) of the electrolyte membrane 38, and a cathode 42 provided on the other side (surface on the side indicated by the arrow A1) of the electrolyte membrane 38.

For example, the electrolyte membrane 38 is a solid polymer ion exchange membrane (cation ion exchange membrane). For example, the sold polymer electrolyte membrane is a thin membrane of perfluorosulfonic acid containing water. The electrolyte membrane 38 is interposed between the anode 40 and the cathode 42. A fluorine based electrolyte may be used as the electrolyte membrane 38. Alternatively, an HC (hydrocarbon) based electrolyte may be used as the electrolyte membrane 38. In the embodiment of the present invention, as shown in FIG. 2, the surface size (outer size) of the electrolyte membrane 38 is smaller than the surface sizes (outer sizes) of the anode 40 and the cathode 42. However, the present invention is not limited specially in this respect.

As shown in FIG. 2, the cathode 42 includes a cathode catalyst layer 42a joined to the surface of the electrolyte membrane 38 on the side indicated by the arrow A1, and a cathode gas diffusion layer 42b stacked on the cathode catalyst layer 42a. The anode 40 includes an anode catalyst layer 40a joined to a surface of the electrolyte membrane 38 on the side indicated by the arrow A2, and an anode gas diffusion layer 40b stacked on the anode catalyst layer 40a.

For example, the cathode catalyst layer 42a is formed by porous carbon particles deposited uniformly on the surface of the cathode gas diffusion layer 42b together with an ion conductive polymer binder and platinum alloy supported on the surfaces of the porous carbon particles. The anode catalyst layer 40a is formed by porous carbon particles deposited uniformly on the surface of the anode gas diffusion layer 40b together with an ion conductive polymer binder and platinum alloy supported on the surfaces of the porous carbon particles. Each of the cathode gas diffusion layer 42b and the anode gas diffusion layer 40b comprises an electrically conductive sheet such as a carbon paper or a carbon cloth.

An electrically conductive porous layer (not shown) may be provided at least at one of a position between the cathode catalyst layer 42a and the cathode gas diffusion layer 42b, and a position between the anode catalyst layer 40a and the anode gas diffusion layer 40b.

The resin frame member 36 has a frame shape. For example, an inner marginal portion of the resin frame member 36 is held between an outer marginal portion of the cathode gas diffusion layer 42b and an outer marginal portion of the anode gas diffusion layer 40b. The inner peripheral end surface of the resin frame member 36 may be positioned close to, in contact with, or overlapped with the outer peripheral end surface of the electrolyte membrane 38.

Examples of materials of the resin frame member 36 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin. Instead of using the resin frame member 36, it may be possible to adopt structure where the electrolyte membrane 38 protrudes outward. Alternatively, frame shaped films may be provided on both sides of the electrolyte membrane 38 which protrude outward.

As shown in FIG. 3, in a marginal portions of the power generation cell 12 at one end in the long side direction of the first separator 30, the second separator 32, and the resin frame member 36 in the long side direction (on the side indicated by the arrow B1), one oxygen-containing gas supply passage 44a, two coolant supply passages 46a, and two fuel gas discharge passages 48b are provided. In a marginal portions of the power generation cell 12 at the other end in the long side direction of the first separator 30, the second separator 32, and the resin frame member 36 (on the side indicated by the arrow B2), one fuel gas supply passage 48a, two coolant discharge passages 46b, and two oxygen-containing gas discharge passages 44b are provided.

For example, a fuel gas such as the hydrogen-containing gas is discharged from the fuel gas discharge passage 48b. For example, an oxygen-containing gas is supplied to the oxygen-containing gas supply passage 44a. For example, at least any one of pure water, ethylene glycol, and oil is supplied as a coolant to the coolant supply passages 46a. A fuel gas is supplied to the fuel gas supply passage 48a. The coolant is discharged from the coolant discharge passages 46b. The oxygen-containing gas is discharged from the oxygen-containing gas discharge passages 44b.

The oxygen-containing gas supply passage 44a, the coolant supply passages 46a, the fuel gas discharge passages 48b, the fuel gas supply passage 48a, the coolant discharge passages 46b, oxygen-containing gas discharge passages 44b (hereinafter referred to as the "fluid passages 44a, 44b, 46a, 46b, 48a, 48b," collectively) penetrate through the structure of the fuel cell stack 14 excluding the terminal plates 18a, 18b (FIG. 2).

It should be noted that the fuel gas supply passage 48a and the fuel gas discharge passages 48b are also referred to as the "fuel gas passages 48a, 48b", collectively. The oxygen-containing gas supply passage 44a and the oxygen-containing gas discharge passages 44b are also referred to as the "oxygen-containing gas passages 44a, 44b"), collectively. Further, the coolant supply passages 46a and the coolant discharge passages 46b are also referred to as the "coolant passages 46a, 46b", collectively.

These fluid passages 44a, 44b, 46a, 46b, 48a, 48b are arranged in the upper/lower direction (in the direction indicated by arrows C1, C2). Specifically, in a marginal portion at one end side (side indicated by the arrow B1) in the long side direction of the power generation cells 12, the two coolant supply passages 46a are arranged remotely from each other in the upper/lower direction, between the two fuel gas discharge passages 48b arranged remotely from each other in the upper/lower direction. The oxygen-containing gas supply passage 44a is provided between these coolant supply passages 46a.

In the marginal portion at the other end side (side indicated by the arrow B2) of the power generation cell 12 in the long side direction, the two coolant discharge passages 46b are arranged remotely from each other in the upper/lower direction, between the two oxygen-containing gas discharge passages 44b arranged remotely from each other in the upper/lower direction. The fuel gas supply passage 48a is disposed between these coolant discharge passages 46b.

The fluid passages 44a, 44b, 46a, 46b, 48a, 48b are not limited to the above layout. The layout of the fluid passages 44a, 44b, 46a, 46b, 48a, 48b can be determined as necessary depending on the required specification. Unlike the embodiment of the present invention, the pair of coolant supply passages 46a may be provided on both sides of the fuel gas supply passage 48a in the upper/lower direction (in the direction indicated by the arrows C1, C2), and the pair of coolant discharge passages 46b may be provided on both sides of the oxygen-containing gas supply passage 44a in the upper/lower direction. Further, in the embodiment of the present invention, the number of the fuel gas discharge passages 48b is two, the number of the oxygen-containing gas discharge passages 44b is two, the number of the coolant supply passages 46a is two, and the number of the coolant discharge passages 46b is two. Alternatively, one fuel gas discharge passage 48b, one oxygen-containing gas discharge passage 44b, one coolant supply passage 46a, and one coolant discharge passage 46b may be provided.

In the embodiment of the present invention, for example, as shown in FIGS. 4 to 7, the shape of the fluid passages 44a, 44b, 46a, 46b, 48a, 48b in the stacking direction (indicated by the arrow A) is a hexagonal shape. The opposing two sides of the hexagonal shape are oriented in the upper/lower direction (indicated by the arrow C). However, the shape of the fluid passages 44a, 44b, 46a, 46b, 48a, 48b in the stacking direction (indicated by the arrow A) is not limited specially to the hexagonal shape, and may be a polygonal shape other than the hexagonal shape, or a polygonal shape having rounded corners.

Figure 4:
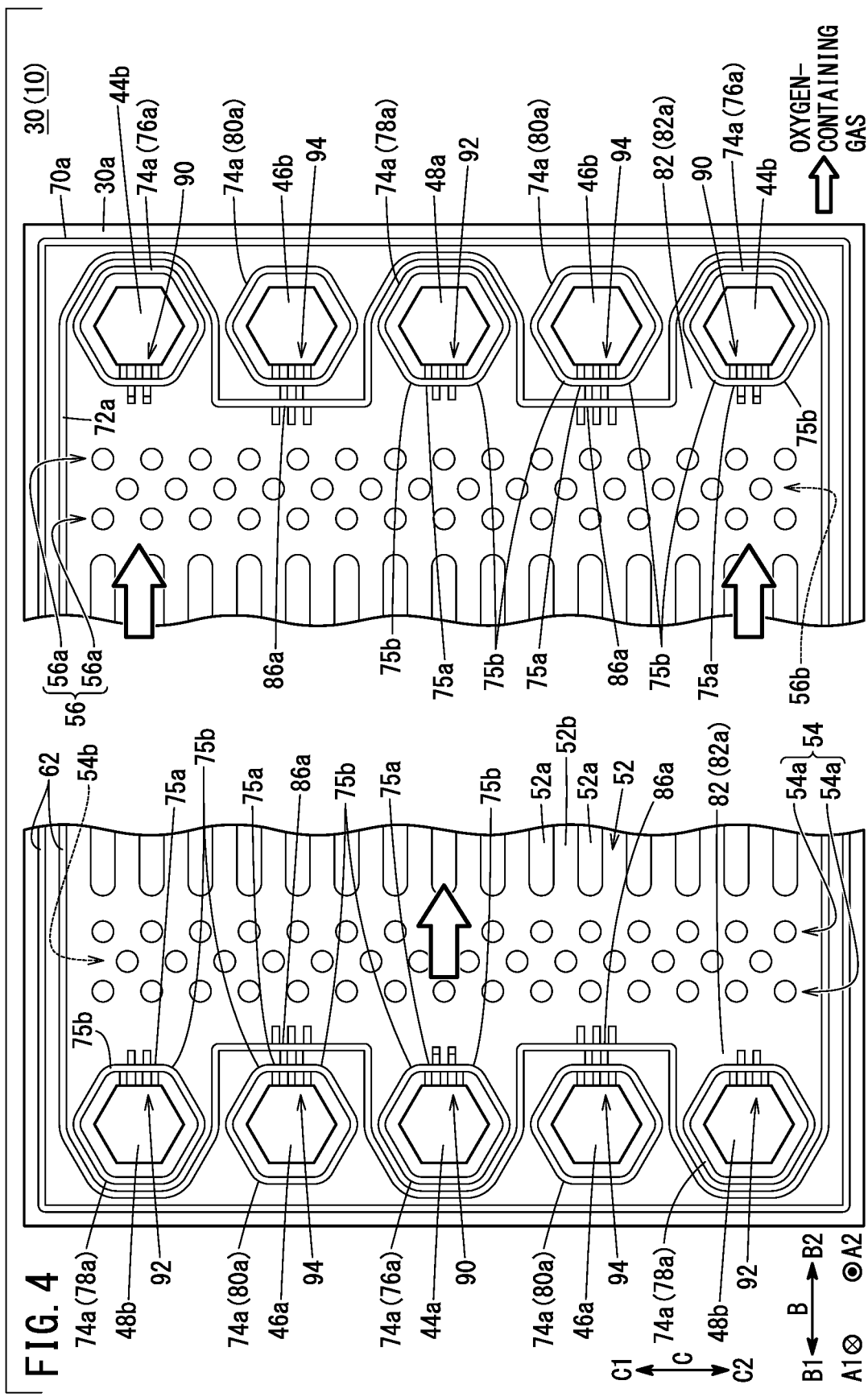
FIG. 4 is a view schematically showing main part of a first separator, on the front side of an oxygen-containing gas flow field of the first separator.

As shown in FIG. 3, the first separator 30 and the second separator 32 have MEA side surfaces 30a, 32a facing the resin frame equipped MEA 28, and coolant side surfaces 30b, 32b on the back of the MEA side surfaces 30a, 32a. As shown in FIG. 4, an oxygen-containing gas flow field 52 is provided on the MEA side surface 30a of the first separator 30 as a passage of the oxygen-containing gas in the separator surface direction (directions indicated by the arrows B and C). The oxygen-containing gas flow field 52 is connected to (in fluid communication with) the one oxygen-containing gas supply passage 44a and the two oxygen-containing gas discharge passages 44b. A plurality of ridges 52a are provided on the MEA side surface 30a of the first separator 30. The ridges 52a extend straight in the direction indicated by the arrow B. Straight flow grooves 52b are formed between the ridges 52a. At least part of the oxygen-containing gas flow field 52 is provided inside the flow grooves 52b. It should be noted that the oxygen-containing gas flow field 52 may not be provided inside the plurality of straight flow grooves 52b, and may be provided inside a plurality of wavy flow grooves (not shown).

As shown in FIG. 4, in the MEA side surface 30a of the first separator 30, an inlet buffer 54 is provided between the oxygen-containing gas supply passage 44a and the oxygen-containing gas flow field 52. The inlet buffer 54 includes a plurality of boss arrays 54a each formed by a plurality of bosses protruding toward the resin frame equipped MEA 28 (on the side indicated by the arrow A2) and arranged in the direction indicated by the arrow C. Further, an outlet buffer 56 is provided in the MEA side surface 30a of the first separator 30, between the oxygen-containing gas discharge passages 44b and the oxygen-containing gas flow field 52. The outlet buffer 56 includes a plurality of boss arrays 56a each formed by a plurality of bosses protruding toward the resin frame equipped MEA 28 and arranged in the direction indicated by the arrow C.

It should be noted that, as shown in FIG. 3, on the coolant side surface 30b of the first separator 30, boss arrays 54b each formed by a plurality of bosses arranged in the direction indicated by the arrow C are provided between the adjacent boss arrays 54a of the inlet buffer 54, and boss arrays 56b each formed a plurality of bosses arranged in the direction indicated by the arrow C are provided between the adjacent boss arrays 56a of the outlet buffer 56. Each of the boss arrays 54b, 56b protrudes toward a coolant flow field 60 (in the direction indicated by the arrow A1) described later to form a buffer on the coolant side.

Figure 5:
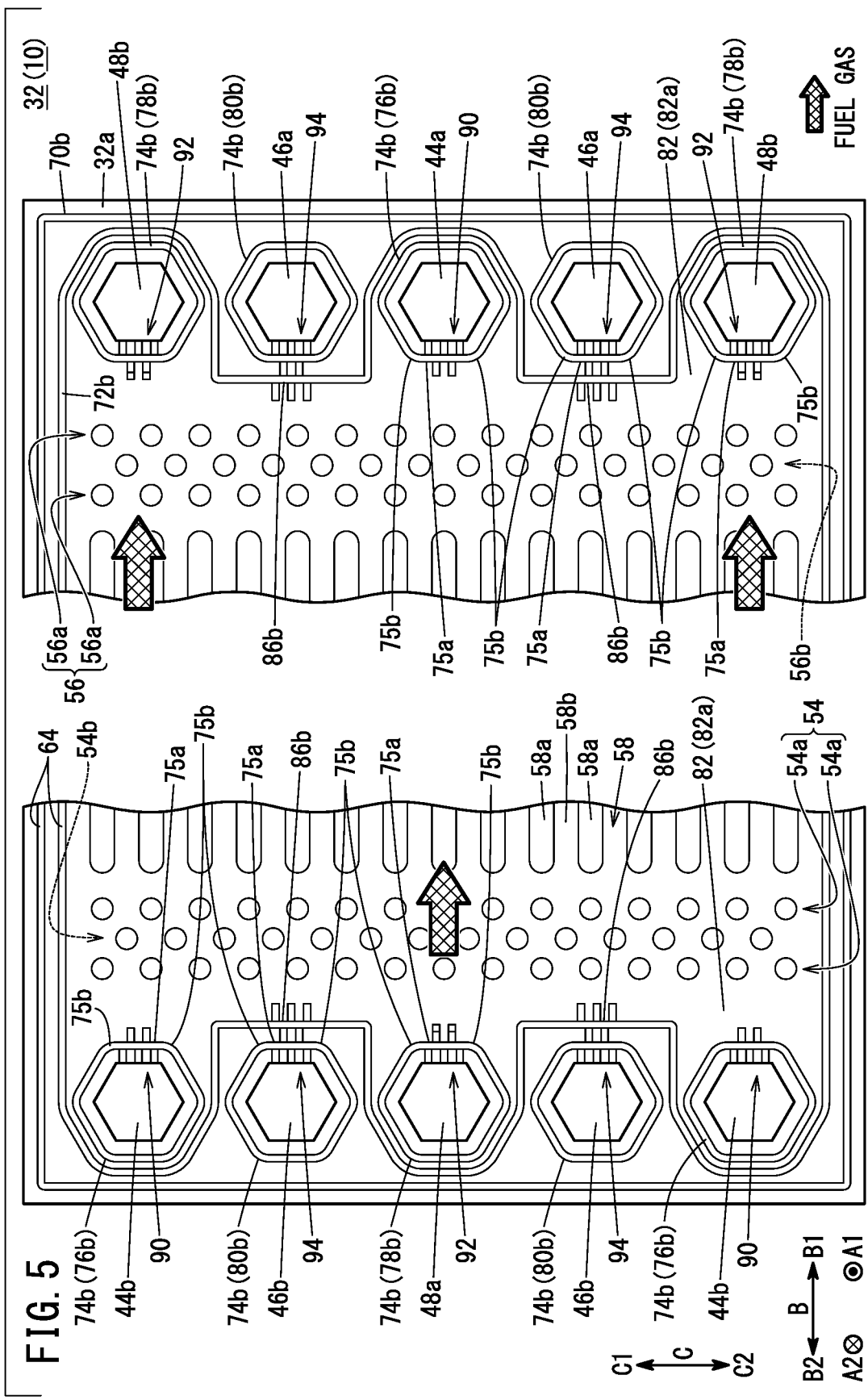
FIG. 5 is a view schematically showing main part of a second separator, on the front side of a fuel gas flow field of the second separator.

As shown in FIG. 5, a fuel gas flow field 58 is provided on the MEA side surface 32a of the second separator 32, as a passage of the fuel gas in the separator surface direction (directions indicated by the arrows B and C). The fuel gas flow field 58 is connected to one fuel gas supply passage 48a and the two fuel gas discharge passages 48b. The plurality of ridges 58a extending straight in the direction indicated by the arrow B are provided on the MEA side surface 32a of the second separator 32, and straight flow grooves 58b are formed between the ridges 58a. At least part of the fuel gas flow field 58 is formed inside these flow grooves 58b. The fuel gas flow field 58 may be provided inside a plurality of wavy flow grooves (not shown), instead of the plurality of straight flow grooves 58b.

An inlet buffer 54 is provided on the MEA side surface 32a of the second separator 32, between the fuel gas supply passage 48a and the fuel gas flow field 58. The inlet buffer 54 includes a plurality of boss arrays 54a each formed by a plurality of bosses protruding toward the resin frame equipped MEA 28, and arranged in the direction indicated by the arrow C. Further, an outlet buffer 56 is provided on the MEA side surface 32a of the second separator 32, between the fuel gas discharge passage 48b and the fuel gas flow field 58. The outlet buffer 56 includes a plurality of boss arrays 56a each formed by a plurality of bosses protruding toward the resin frame equipped MEA 28, and arranged in the direction indicated by the arrow C.

Figure 6:
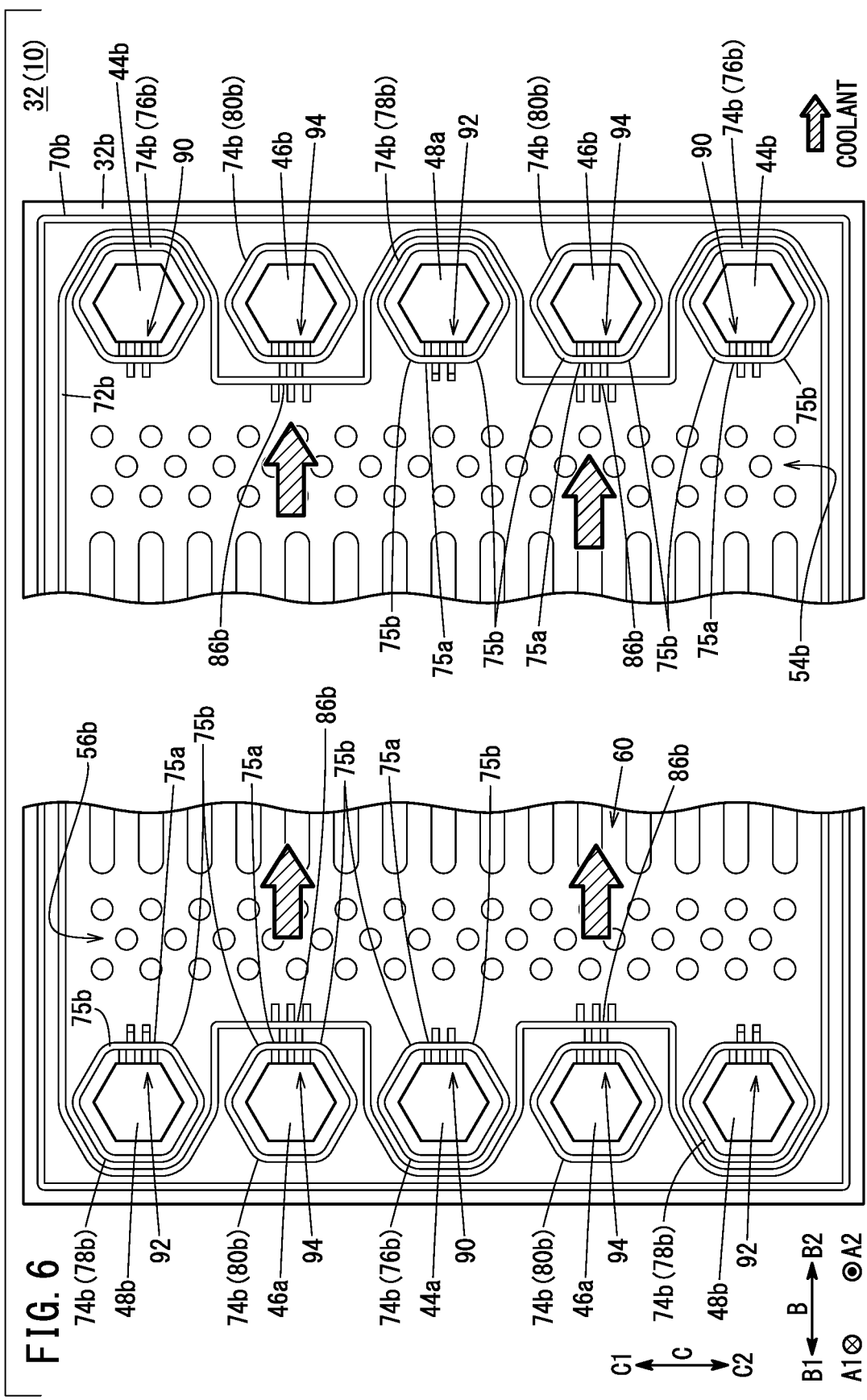
FIG. 6 is a view schematically showing main part of the second separator, on the front side of a coolant flow field of the second separator.

It should be noted that, as shown in FIG. 6, on the coolant side surface 32b of the second separator 32, boss arrays 54b each formed by a plurality of bosses arranged in the direction indicated by the arrow C are provided between the adjacent boss arrays 54a of the inlet buffer 54, and boss array 56b each formed a plurality of bosses arranged in the direction indicated by the arrow C are provided between the adjacent boss arrays 56a of the outlet buffer 56. Each of the boss arrays 54b, 56b protrudes toward the coolant flow field 60 (in the direction indicated by the arrow A2) to form a buffer on the coolant side.

The coolant flow field 60 is provided between the coolant side surface 30b of the first separator 30 and the coolant side surface 32b of the second separator 32 that are joined together. The coolant flows through the coolant flow field 60 in the separator surface directions (directions indicated by the arrows B and C). The coolant flow field 60 is connected to (in fluid communication with) the two coolant supply passages 46a and the two coolant discharge passages 46b. When the MEA side surface 30a of the first separator 30 where the oxygen-containing gas flow field 52 is formed and the MEA side surface 32a of the second separator 32 where the fuel gas flow field 58 is formed are overlapped with other, the coolant flow field 60 is formed between the back surface of the MEA side surface 30a and the back surface of the MEA side surface 32a.

Hereinafter, the oxygen-containing gas flow field 52, the fuel gas flow field 58, and the coolant flow field 60 are referred to as the "fluid flow fields 52, 58, 60". Portions around the fluid passages 44a, 44b, 46a, 46b, 48a, 48b in the first separator 30 and the second separator 32 are joined together by welding, brazing, etc.

As shown in FIG. 4, an outer bead seal 70a, an inner bead seal 72a, and passage bead seals 74a (metal bead seals) are formed by press forming of the first separator 30 in a manner that the outer bead seal 70a, the inner bead seal 72a, and the passage bead seals 74a are expanded in the separator thickness direction toward the resin frame equipped MEA 28

(FIG. 3). It should be that the outer bead seal 70a, the inner bead seal 72a, and the passage bead seals 74a are also referred to as the first seal line, collectively.

As shown in FIG. 5, an outer bead seal 70b, an inner bead seal 72b, and passage bead seals 74b (metal bead seals) are formed by press forming of the second separator 32 in a manner that the outer bead seal 70b, the inner bead seal 72b, and the passage bead seals 74b are expanded in the separator thickness direction toward the resin frame equipped MEA 28 (FIG. 3). It should be that outer bead seal 70b, the inner bead seal 72b, and the passage bead seals 74b are also referred to as the second seal line, collectively.

As shown in FIG. 2, resin material 68 is fixed to each of a front end surface 62 of the first seal line and a front end surface 64 of the second seal line by printing, coating, etc. In the drawings other than FIG. 2, the resin material 68 is not illustrated. The front end surface 62 of the first seal line is brought into contact with the front end surface 64 of the second seal line of the second separator 32 of the other joint separator through the resin material 68 and the resin frame member 36. For example, polyester fiber, etc. is used as the resin material 68. The resin material 68 may be fixed to the resin frame member 36, instead of the first seal line and the second seal line. Further, the fuel cell joint separator 10 may not include the resin material 68.

As shown in FIG. 4, the outer bead seal 70a is formed around the outer marginal portion of the first separator 30. The inner bead seal 72a is formed around all of the oxygen-containing gas flow field 52, the inlet buffer 54, the outlet buffer 56, the oxygen-containing gas passages 44a, 44b, and the fuel gas passages 48a, 48b. The plurality of passage bead seals 74a are formed around the fluid passages 44a, 44b, 46a, 46b, 48a, 48b, respectively.

Hereinafter, as shown in FIG. 4, the passage bead seals 74a formed around the oxygen-containing gas passages 44a, 44b are also referred to as an "oxygen-containing gas passage bead seals 76a", the passage bead seals 74a formed around the fuel gas passages 48a, 48b are also referred to as a "fuel gas passage bead seals 78a", and the passage bead seals 74a formed around the coolant passages 46a, 46b are also referred to as a "coolant passage bead seals 80a".

As shown in FIG. 5, the outer bead seal 70b is formed around the outer marginal portion of the second separator 32. The inner bead seal 72b is formed around all of the fuel gas flow field 58, the inlet buffer 54, the outlet buffer 56, the oxygen-containing gas passages 44a, 44b, and the fuel gas passages 48a, 48b. The plurality of passage bead seals 74b are formed around the fluid passages 44a, 44b, 46a, 46b, 48a, 48b, respectively.

As shown in FIG. 5, the passage bead seals 74b formed around the oxygen-containing gas passages 44a, 44b are also referred to as an "oxygen-containing gas passage bead seals 76b", the passage bead seals 74b formed around the fuel gas passages 48a, 48b are also referred to as a "fuel gas passage bead seals 78b", and the passage bead seals 74b formed around the coolant passages 46a, 46b are also referred to as a "coolant passage bead seals 80b".

As shown in FIGS. 4 to 6, as viewed in the separator thickness direction (stacking direction indicated by the arrow A), the outer bead seals 70a, 70b have a rectangular annular shape extending along the long sides and the short sides of the rectangular fuel cell joint separator 10. Further, as viewed in the separator thickness direction, the passage bead seals 74a, 74b have a hexagonal annular shape having rounded corners, in correspondence with the shapes of the fluid passages. Each of the passage bead seals 74a, 74b includes a straight portion 75a, e.g., extending straight in the short side direction (in the direction indicated by the arrow C), on the central side of the fuel cell joint separator 10 (hereinafter the side adjacent to the flow fields 52, 58, 60 will also be simply referred as the flow field side), and curved portions 75b provided on both sides of the straight portion 75a in the peripheral direction of the passage bead seals 74a, 74b. It should be noted that the straight portion 75a need not always extend straight. The straight portion 75a may be curved at a radius of curvature which is larger than that of the curved portion 75b.

Figure 8:
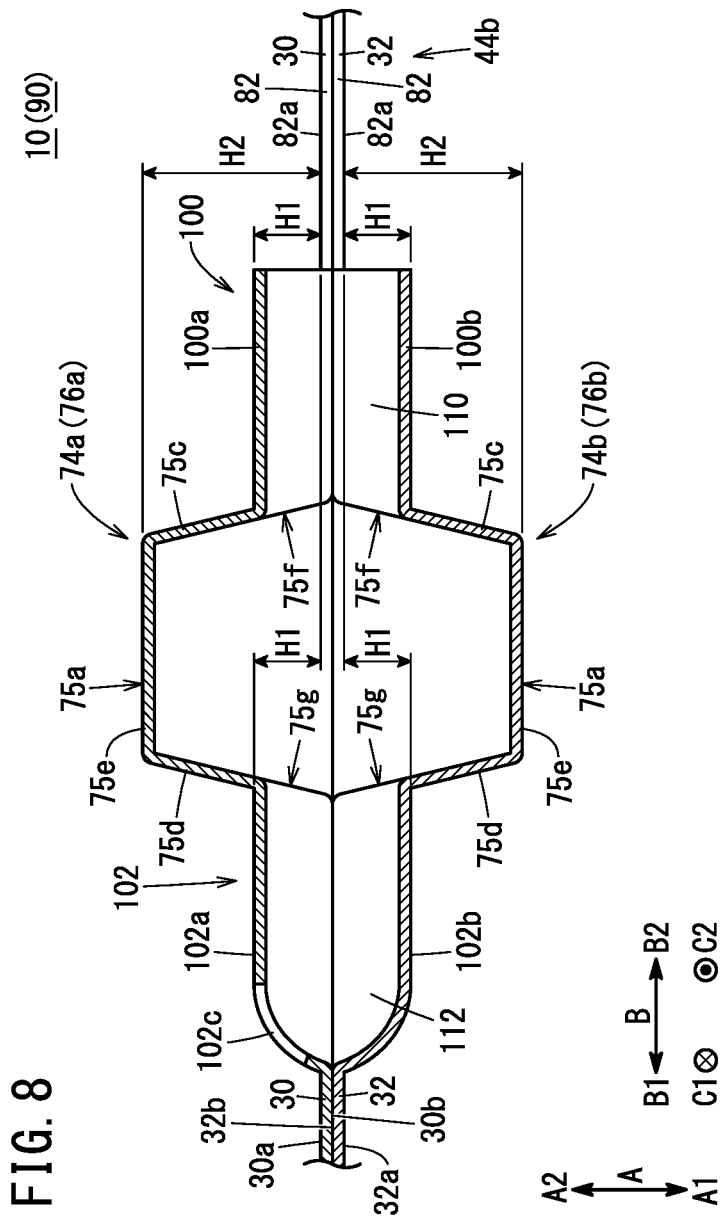
FIG. 8 is a cross sectional view taken along a line VIII-VIII indicated by arrows in FIG. 7.
Figure 9:
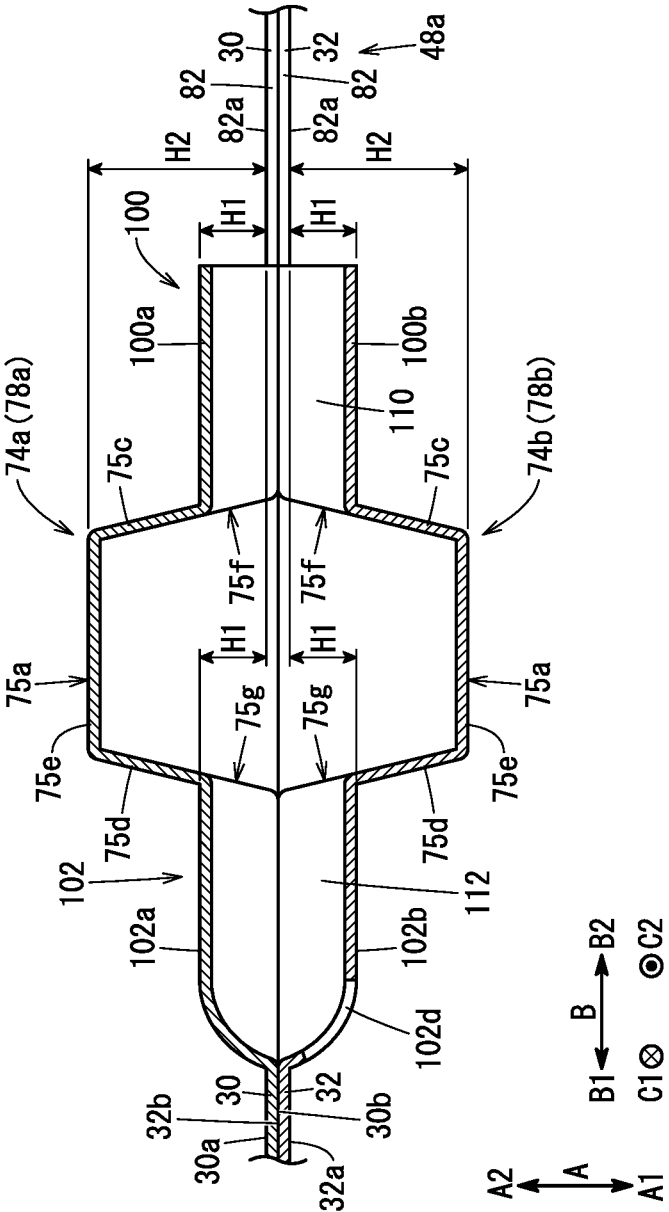
FIG. 9 is a cross sectional view taken along a line IX-IX indicated by arrows in FIG. 7.
Figure 10:
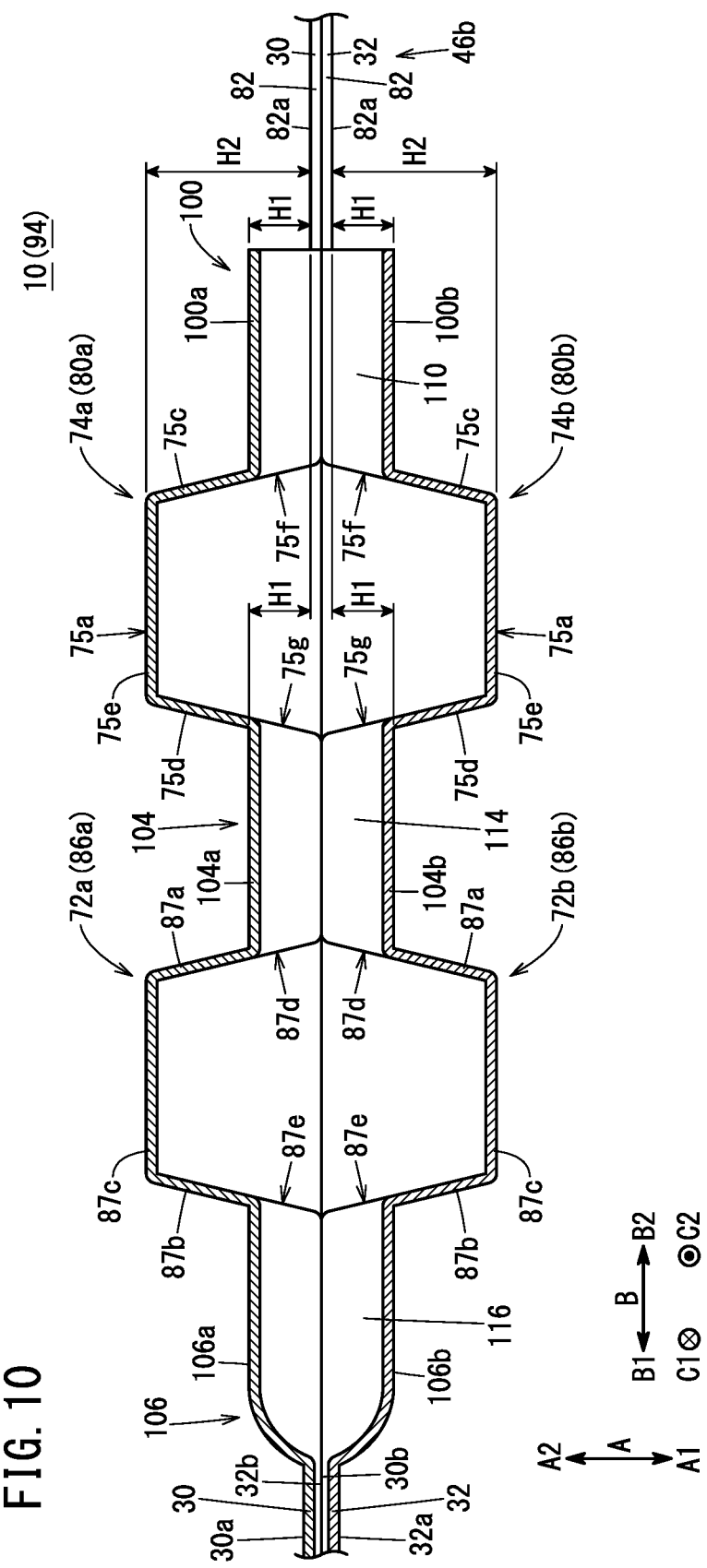
FIG. 10 is a cross sectional view taken along a line X-X indicated by arrows in FIG. 7.

As shown in FIGS. 8 to 10, the passage bead seal 74a of the first separator 30 includes an inner side wall 75c (side wall) and an outer side wall 75d (side wall) which rise upright from a base plate part 82 of the first separator 30, and a top portion 75e connecting the inner side wall 75c and the outer side wall 75d. The passage bead seal 74b of the second separator 32 includes an inner side wall 75c (side wall) and an outer side wall 75d (side wall) which rise upright from the base plate part 82 of the second separator 32, and a top portion 75e connecting the inner side wall 75c and the outer side wall 75d.

The inner side wall 75c and the outer side wall 75d are inclined in directions in which the inner side wall 75c and the outer side wall 75d get closer to each other, toward the top portion 75e. Therefore, each of the passage bead seals 74a, 74b has a trapezoidal shape in cross section in the separator thickness direction. It should be noted that the inner side wall 75c and the outer side wall 75d of the passage bead seals 74a, 74b may be in parallel to the separator thickness direction, and the passage bead seals 74a, 74b may have a square shape or a rectangular shape in cross section in the separator thickness direction. Further, as in the case of the passage bead seals 74a, 74b, the cross sectional shape of the outer bead seals 70a, 70b and the inner bead seals 72a, 72b in the separator thickness direction may have a trapezoidal shape, a square shape or a rectangular shape in the separator thickness direction.

Figure 7:
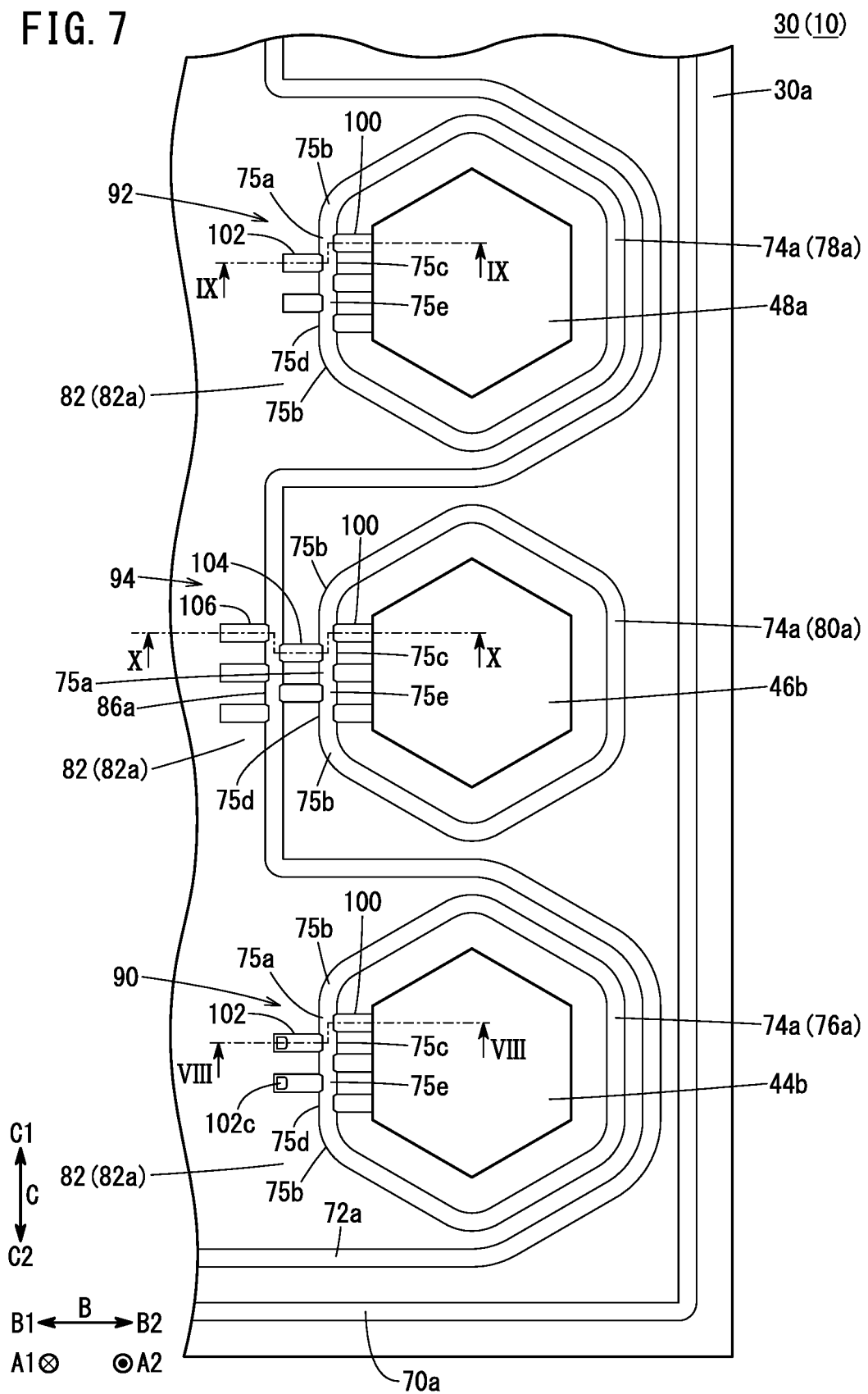
FIG. 7 is an enlarged view showing main part of FIG. 5.

As shown in FIGS. 4 and 7, as viewed in the separator thickness direction, the inner bead seal 72a of the first separator 30 includes a facing portion 86a which extends in the direction indicated by the arrow C, e.g., straight on the flow field side of the straight portion 75a of the coolant passage bead seal 80a. As shown in FIG. 10, the facing portion 86a of the inner bead seals 72a includes a first side wall 87a and a second side wall 87b which rise from the base plate part 82 of the first separator 30 toward the side indicated by the arrow A2, and a top portion 87c connecting the first side wall 87a and the second side wall 87b. The first side wall 87a faces the outer side wall 75d of the straight portion 75a of the coolant passage bead seal 80a at a distance. The second side wall 87b is provided on the flow field side of the first side wall 87a.

As shown in FIG. 5, as viewed in the separator thickness direction, the inner bead seal 72b of the second separator 32 includes a facing portion 86b, e.g., extending straight in the direction indicated by the arrow C, on the flow field side of the straight portion 75a of the coolant passage bead seal 80b. As shown in FIG. 10, the facing portion 86b of the inner bead seal 72b includes a first side wall 87a and a second side wall 87b which rise from the base plate part 82 of the second separator 32 toward the side indicted by the arrow A1, and a top portion 87c connecting the first side wall 87a and the second side wall 87b. The first side wall 87a faces the outer side wall 75d of the straight portion 75a of the coolant passage bead seal 80b at a distance. The second side wall 87b is provided on the flow field side of the first side wall 87a.

It should be noted that FIGS. 8 to 10 show the first separator 30 and the second separator 32 in cross section in the state where the first separator 30 and the second separator 32 are assembled together into the fuel cell stack 14 (in the state where compression load is applied to the first seal line and the second seal line). In the state before the first separator 30 and the second separator 32 are assembled together into the fuel cell stack 14 (in the state where no compression load is applied), the shape of the top portion 75e of the passage bead seals 74a, 74b may have a curved shape expanding in the protruding direction. In the state where fuel cell stack 14 is assembled, the shape of the top portions 75e of the passage bead seals 74a, 74b has a flat shape as shown in FIGS. 8 to 10.

As shown in FIG. 4, as viewed in separator thickness direction (indicated by the arrow A), an oxygen-containing gas bridge section 90 is provided on the MEA side surface 30a of the first separator 30. The oxygen-containing gas bridge section 90 connects the inside and the outside of the portion surrounded by the oxygen-containing gas passage bead seal 76a. The oxygen-containing gas bridge section 90 is provided in the straight portion 75a of each of the oxygen-containing gas passage bead seal 76a in a manner to connect the oxygen-containing gas passages 44a, 44b and the oxygen-containing gas flow field 52.

As shown in FIG. 5, a fuel gas bridge section 92 is provided on the MEA side surface 32a of the second separator 32. The fuel gas bridge section 92 connects the inside and outside of the portion surrounded by the fuel gas passage bead seal 78b, as viewed in the separator thickness direction. The fuel gas bridge section 92 is disposed in the straight portion 75a of the fuel gas passage bead seal 78b in a manner to connect each of the fuel gas passages 48a, 48b and the fuel gas flow field 58.

As viewed in the separator thickness direction, a coolant bridge section 94 is provided on each of coolant side surfaces 30b, 32b of the first separator 30 and the second separator 32 facing each other. The coolant bridge section 94 connects the inside and outside of the portion surrounded by each of the coolant passage bead seals 80a, 80b. The coolant bridge section 94 is disposed on the straight portion 75a of each of the coolant passage bead seals 80a, 80b and each of the facing portions 86a, 86b of the inner bead seals 72a, 72b in a manner to connect each of the coolant passages 46a, 46b and the coolant flow field 60.

As shown in FIGS. 4 to 7, each of the oxygen-containing gas bridge section 90 and the fuel gas bridge section 92 has a plurality of inner tunnels 100 and a plurality of outer tunnels 102 (tunnels). Further, the coolant bridge section 94 includes a plurality of inner tunnels 100, a plurality of outer tunnels 104 (tunnels), and a plurality of outermost tunnels 106.

As show in FIG. 8, the inner tunnel 100 of the oxygen-containing gas bridge section 90 is coupled to the inner side wall 75c of the straight portion 75a of each of the oxygen-containing gas passage bead seals 76a, 76b. The outer tunnel 102 of the oxygen-containing gas bridge section 90 is coupled to the outer side wall 75d of the straight portion 75a of each of the oxygen-containing gas passage bead seals 76a, 76b. As shown in FIG. 9, the inner tunnel 100 of the fuel gas bridge section 92 is coupled to the inner side wall 75c of the straight portion 75a of the fuel gas passage bead seals 78a, 78b. The outer tunnel 102 of the fuel gas bridge section 92 is coupled to the outer side wall 75d of each of the straight portions 75a of each of the fuel gas passage bead seals 78a, 78b.

In each of the oxygen-containing gas bridge section 90 and the fuel gas bridge section 92, the plurality of inner tunnels 100 and the plurality of outer tunnels 102 extend in opposite directions from the straight portion 75a in the separator surface directions (directions indicated by the arrows B and C). As shown in FIG. 7, the plurality of inner tunnels 100 and the plurality of outer tunnels 102 are disposed at intervals in the direction indicated by the arrow C. In the embodiment, the plurality of inner tunnels 100 and the plurality of outer tunnels 102 are arranged in a zigzag pattern along the straight portion 75a. It should be noted that the plurality of inner tunnels 100 and the plurality of outer tunnels 102 may be disposed to face each other through the straight portion 75a.

As shown in FIGS. 8 and 9, the inner tunnel 100 of each of the oxygen-containing gas bridge section 90 (FIG. 8) and the fuel gas bridge section 92 (FIG. 9) includes a first tunnel 100a provided in the first separator 30 and a second tunnel 100b provided in the second separator 32. The outer tunnel 102 includes a first tunnel 102a provided in the first separator 30 and a second tunnel 102b provided in the second separator 32.

The first tunnels 100a, 102a are formed by expanding the first separator 30 by press forming in a manner that the first tunnels 100a, 102a protrude from the base plate part 82 toward the resin frame equipped MEA 28 adjacent to the first separator 30, in the stack body 16 (FIG. 2). Further, as viewed in the separator thickness direction, each of the plurality of the first tunnel 100a, 102a extends in the direction indicated by the arrows B.

The second tunnels 100b, 102b are formed by expanding the second separator 32 by press forming in a manner that the second tunnels 100b, 102b protrude from the base plate part 82 toward the resin frame equipped MEA 28 adjacent to the second separator 32, in the stack body 16. As viewed in the separator thickness direction of the fuel cell joint separator 10, the positions of the second tunnels 100b, 102b are overlapped with the positions of the first tunnels 100a, 102a.

The first tunnel 100a and the second tunnel 100b, of the inner tunnel 100 have the same width in a direction perpendicular to the direction in which the first tunnel 100a and the second tunnel 100b extend, and has the same protruding height by which the first tunnel 100a and the second tunnel 100b protrude from the base plate part 82. The first tunnel 102a and the second tunnel 102b, of the outer tunnels 102 have the same width in a direction perpendicular to the direction in which the first tunnel 102a and the second tunnel 102b extend, and has the same protruding height by which the first tunnel 102a and the second tunnel 102b protrude from the base plate part 82.

As shown in FIGS. 8 and 9, an inner space 110 is formed at each position between the first tunnel 100a and the second tunnel 100b in the fuel cell joint separator 10. Further, an inner space 112 is formed at each position between the first tunnel 102a and the second tunnel 102b of the fuel cell joint separator 10.

With reference to FIGS. 7 and 8, the inner tunnel 100 and the outer tunnel 102 of the oxygen-containing gas bridge section 90 which connect the oxygen-containing discharge passage 44b and the oxygen-containing gas flow field 52 (FIG. 4) will be described specifically. One end of each of the first tunnel 100a and the second tunnel 100b of the inner tunnel 100 (end on the side indicated by the arrow B1) are coupled to the inner side wall 75c of the straight portions 75a of the oxygen-containing gas passage bead seals 76a, 76b, through a through hole 75f provided in the inner side wall 75c. Further, the other end of each of the first tunnel 100a and the second tunnel 100b of the inner tunnel 100 in the direction in which the first tunnel 100a and the second tunnel 100b extend (end on the side indicated by the arrow B2) is opened to the oxygen-containing gas discharge passage 44b.

One end of each of the first tunnel 102a and the second tunnel 102b of the outer tunnel 102 in the direction in which the first tunnel 102a and the second tunnel 102b extends (end on the side indicated by the arrow B2) is coupled to the outer side wall 75d of each of the straight portions 75a of the oxygen-containing gas passage bead seals 76a, 76b through a through hole 75g provided in the outer side wall 75d. Further, the other end of each of the first tunnel 102a and the second tunnel 102b of the outer tunnel 102 in the direction in which the first tunnel 102a and the second tunnel 102b extend (end on the side indicated by the arrow B1) is provided adjacent to the outlet buffer 56 (see FIG. 4).

An opening 102c is provided at the other end of the first tunnel 102a of the outer tunnel 102 (end on the side indicated by the arrow B1) in the extending direction thereof. The opening 102c connects the inner space 112 of the outer tunnel 102 and the oxygen-containing gas flow field 52 (see FIG. 4). Therefore, the oxygen-containing gas flow field 52 (FIG. 4) and the oxygen-containing gas discharge passage 44b are connected together through the inner space 112 of the outer tunnel 102, the inside of the oxygen-containing gas passage bead seals 76a, 76b, and the inner space 110 of the inner tunnel 100.

The inner tunnel 100 and the outer tunnel 102 connecting the oxygen-containing gas supply passage 44a and the oxygen-containing gas flow field 52 shown in FIG. 4 have substantially the same structure as the inner tunnel 100 and the outer tunnel 102 in FIGS. 7 and 8, except that the directions indicated by the arrow B are opposite. That is, the oxygen-containing gas supply passage 44a (FIG. 4) and the oxygen-containing gas flow field 52 are connected together through the inner space 110 of the inner tunnel 100, the inside of the oxygen-containing gas passage bead seals 76a, 76b, and the inner space 112 of the outer tunnel 102.

With reference to FIGS. 7 and 9, the inner tunnel 100 and the outer tunnel 102 of the fuel gas bridge section 92 connecting the fuel gas supply passage 48a and the fuel gas flow field 58 will be described specifically. One end of each of the first tunnel 100a and the second tunnel 100b of the inner tunnel 100 in the direction in which the first tunnel 100a and the second tunnel 100b extend (end on the side indicated by the arrow B1) is coupled to the inner side wall 75c of each of the straight portions 75a of the fuel gas passage bead seals 78a, 78b through the through hole 75f provided in the inner side wall 75c. Further, the other end of each of the first tunnel 100a and the second tunnel 100b of the inner tunnel 100 (end on the side indicated by the arrow B2) is opened to the fuel gas supply passage 48a.

One end of each of the first tunnel 102a and the second tunnel 102b of the outer tunnel 102 (end on the side indicated by the arrow B2) is coupled to the outer side wall 75d of each of the straight portions 75a of the fuel gas passage bead seals 78a, 78b through the through hole 75g provided in the outer side wall 75d. Further, the other end of each of the first tunnel 102a and the second tunnel 102b of the outer tunnel 102 (end on the side indicated by the arrow B1) is disposed adjacent to the inlet buffer 54 (FIG. 5).

An opening 102d is provided at the other end of each of the first tunnel 102a of the outer tunnel 102 in the direction in which the first tunnel 102a extends (end on the side indicated by the arrow B1). The opening 102d connects the inner space 112 of the outer tunnel 102 and the fuel gas flow field 58 (FIG. 5). Therefore, the fuel gas supply passage 48a and the fuel gas flow field 58 (FIG. 5) are connected together through the inner space 112 of the inner tunnel 100, the inside of the fuel gas passage bead seals 78a, 78b, and the inner space 112 of the outer tunnel 102.

The inner tunnel 100 and the outer tunnel 102 connecting the fuel gas discharge passage 48b and the fuel gas flow field 58 shown in FIG. 5 have the same structure as the inner tunnel 100 and the outer tunnel 102 in FIGS. 7 and 9 except that the directions indicated by the arrow B are opposite. That is, the fuel gas flow field 58 (FIG. 5) is connected to the fuel gas discharge passage 48b through the inner space 112 of the outer tunnel 102, the inside of the fuel gas passage bead seals 78a, 78b, and the inner space 110 of the inner tunnel 100.

As shown in FIGS. 7 and 10, the inner tunnel 100 of the coolant bridge section 94 is coupled to the inner side wall 75c of each of the straight portions 75a of the coolant passage bead seals 80a, 80b. One end of the outer tunnel 104 of the coolant bridge section 94 is coupled to the outer side wall 75d of each of the straight portions 75a of the coolant passage bead seals 80a, 80b, and the other end of the outer tunnel 104 is coupled to the first side wall 87a of each of the facing portions 86a, 86b of the inner bead seals 72a, 72b. The outermost tunnel 106 of the coolant bridge section 94 is coupled to the second side wall 87b of each of the facing portions 86a, 86b of the inner bead seals 72a, 72b.

In the coolant bridge section 94, the plurality of inner tunnels 100 and the plurality of outer tunnels 104 extend from the straight portion 75a in the separator surface direction (directions indicated by the arrows B and C), in opposite directions. The plurality of outer tunnels 104 and the plurality of outermost tunnels 106 extend from the facing portions 86a, 86b in the separator surface direction, in opposite directions. The plurality of inner tunnels 100, the plurality of outer tunnels 104, and the plurality of outermost tunnels 106 are disposed at intervals in the direction indicated by the arrow C.

As shown in FIGS. 4 and 5, in the embodiment of the present invention, the plurality of inner tunnels 100 and the plurality of outer tunnels 104 are disposed in a zigzag pattern along the straight portion 75a. Further, the plurality of outer tunnels 104 and the plurality of outermost tunnels 106 are disposed in a zigzag pattern along the facing portions 86a, 86b. It should be noted that the plurality of inner tunnels 100 and the plurality of outer tunnels 104 may be provided oppositely through the straight portion 75a. Further, the plurality of outer tunnels 104 and the plurality of outermost tunnels 106 may be disposed oppositely through each of the facing portions 86a, 86b.

The inner tunnel 100 of the coolant bridge section 94 has the same structure as the inner tunnel 100 of the oxygen-containing gas bridge section 90 and the fuel gas bridge section 92 described above. That is, the inner tunnel 100 includes a first tunnel 100a provided in the first separator 30, and a second tunnel 100b provided in the second separator 32, and an inner space 110 is formed between the first tunnel 100a and the second tunnel 100b.

The outer tunnel 104 of the coolant bridge section 94 includes a first tunnel 104a provided in the first separator 30, and a second tunnel 104b provided in the second separator 32. The outermost tunnel 106 includes a first tunnel 106a provided in the first separator 30 and a second tunnel 106b provided in the second separator 32.

The first tunnel 104a of the outer tunnel 104 and the first tunnel 106a of the outermost tunnel 106 are formed by expanding the first separator 30 by press forming in a manner that the first tunnels 104a, 106a protrude from the base plate part 82 in the separator thickness direction toward the resin frame equipped MEA 28 adjacent to the first separator 30, in the stack body 16 (FIG. 2). Further, as viewed in the separator thickness direction, for example, each of the plurality of first tunnels 104a, 106a extends in the direction indicated by the arrow B.

The second tunnel 104b of the outer tunnel 104 and the second tunnel 106b of the outermost tunnel 106 is formed by expanding the second separator 32 by press forming in a manner that the second tunnels 104b, 106b protrude from the base plate part 82 in the separator thickness direction toward the resin frame equipped MEA 28 adjacent to the second separator 32, in the stack body 16 (FIG. 2). As viewed in the thickness direction of the joint separator, the positions of the second tunnels 104b, 106b are overlapped with the positons of the first tunnels 104a, 106a.

As in the case of the inner tunnel 100, also in the outer tunnel 104, the first tunnel 104a and the second tunnel 104b have the same width in a direction perpendicular to the direction in which the first tunnel 104a and the second tunnel 104b extend. Further, the first tunnel 104a and the second tunnel 104b have the same protruding height by which the first tunnel 104a and the second tunnel 104b protrude from the base plate part 82. Further, also in the outermost tunnel 106, the first tunnel 106a and the second tunnel 106b have the same width in a direction perpendicular to the direction in which the first tunnel 106a and the second tunnel 106b extend, and the first tunnel 106a and the second tunnel 106b have the same protruding height by which the first tunnel 106a and the second tunnel 106b protrude from the base plate part 82. As shown in FIG. 10, inner spaces 114, 116 are formed between the first tunnels 104a, 106a and the second tunnels 104b, 106b of the fuel cell joint separator 10.

With reference to FIGS. 7 and 10, the inner tunnel 100, the outer tunnel 104, and the outermost tunnel 106 of the coolant bridge section 94 connecting the coolant discharge passage 46b and the coolant flow field 60 will be described below specifically. One end of each of the first tunnel 100a and the second tunnel 100b of the inner tunnel 100 in the direction in which the first tunnel 100a and the second tunnel 100b extend (end on the side indicated by the arrow B1) is coupled to the inner side wall 75c of each of the straight portions 75a of the coolant passage bead seals 80a, 80b through the through hole 75f provided in the inner side wall 75c. Further, the other end (end on the side indicated by the arrow B2) of each of the first tunnel 100a and the second tunnel 100b of the inner tunnel 100 in the direction in which the first tunnel 100a and the second tunnel 100b extend is opened to the coolant discharge passage 46b.

One end of each of the first tunnel 104a and the second tunnel 104b of the outer tunnel 104 in the direction in which the first tunnel 104a and the second tunnel 104b extend (the other end on the side indicated by the arrow B2) is coupled to the outer side wall 75d of each of the straight portions 75a of the coolant passage bead seals 80a, 80b through the through hole 75g provided in the outer side wall 75d. Further, the other end of each of the first tunnel 104a and the second tunnel 104b in the direction in which the first tunnel 104a and the second tunnel 104b extend (end on the side indicated by the arrow B1) is coupled to the first side wall 87a of each of the facing portions 86a, 86b of the inner bead seals 72a, 72b through a through hole 87d provided in the first side wall 87a.

One end of each of the first tunnel 106a and the second tunnel 106b of the outermost tunnel 106 in the direction in which the first tunnel 106a and the second tunnel 106b extend (end on the side indicated by the arrow B2) is coupled to the second side wall 87b of each of the facing portions 86a, 86b of the inner bead seals 72a, 72b through a through hole 87e provided in the second side wall 87b. The other end of each of the first tunnel 106a and the second tunnel 106b in the direction in which the first tunnel 106a and the second tunnel 106b extend (end on the side indicated by the arrow B1) is disposed adjacent to the buffer section on the coolant side (boss arrays 56b in FIGS. 3 and 6).

In the structure, the coolant flow field 60 and the coolant discharge passage 46b are connected together through the position between the coolant side surface 30b of the first separator 30 and the coolant side surface 32b of the second separator 32, the inner space 116 of the outermost tunnel 106, the inside of the inner bead seals 72a, 72b, the inner space 114 of the outer tunnel 104, the inside of the coolant passage bead seals 80a, 80b, and the inner space 110 of the inner tunnel 100.

The inner tunnel 100, the outer tunnel 104, and the outermost tunnel 106 connecting the coolant supply passage 46a and the coolant flow field 60 shown in FIG. 6 have the same structure as the inner tunnel 100, the outer tunnel 104, and the outermost tunnel 106 shown in FIGS. 7 and 10 except that the directions indicated by the arrow B are opposite. That is, the coolant supply passage 46a and the coolant flow field 60 are connected together through the inner space 110 of the inner tunnel 100, the inside of the coolant passage bead seals 80a, 80b, the inner space 114 of the outer tunnel 104, the inside of the inner bead seals 72a, 72b, the inner space 116 of the outermost tunnel 106, and the position between the coolant side surface 30b of the first separator 30 and the coolant side surface 32b of the second separator 32.

Hereinafter, as shown in FIGS. 8 to 10, in the case where a surface of the base plate part 82 adjacent to the resin frame equipped MEA 28 is referred to as a reference surface 82a, the protruding height by which the inner tunnel 100 and the outer tunnels 102 and 104 protrude from the reference surface 82a will also be regarded as the "tunnel height H1". In the embodiment of the present invention, the inner tunnel 100 and the outer tunnels 102, 104 have the same protruding height. Alternatively, the inner tunnel 100 and the outer tunnels 102, 104 may have different protruding heights. Further, the protruding height of the passage bead seals 74a, 74b by which the passage bead seals 74a, 74b protrude from the reference surface 82a will also be referred to as the "bead seal height H2".

The average value of the surface pressure in the direction in which the straight portion 75a extends, applied to the front end surface (top portion 75e) of the straight portion 75a of the passage bead seals 74a, 74b in the direction in which the straight portion 75a protrudes, by the compression load is also referred to as the "straight portion line pressure". The average value of the surface pressure per unit length in the direction in which the curved portion 75b extends, applied to the front end surface (top portion 75e) of the curved portion 75b in the direction in which the curved portion 75b protrudes, by the compression load is also referred to as the "curved portion line pressure".

In the fuel cell joint separator 10, the tunnel height H1 is determined to be lower than the bead seal height H2 by not less than a predetermined value, in a manner that the straight portion line pressure becomes equal to the curved portion line pressure. The expression "the straight portion line pressure is the same as the curved portion line pressure" herein means that the straight portion line pressure is within 80% to 120% of the curved portion line pressure. Further, the "predetermined value" herein can be determined, e.g., based on, e.g., the material, the shape, and the size of the fuel cell joint separator 10, and the shapes, the sizes, and the layout of the passage bead seals 74a, 74b, and the fluid passages 44a, 44b, 46a, 46b, 48a, 48b, and can be calculated in advance by simulations, etc. In the embodiment of the present invention, the tunnel height H1 is determined to be not more than 50% of the bead seal height H2.

The straight portion 75a is coupled to the inner tunnels 100 and the outer tunnels 102, 104 (hereinafter also collectively referred to as the tunnels). Therefore, the straight portion 75a cannot be elastically deformed easily, and the line pressure tends to be large in comparison with the other portions of the passage bead seals 74a, 74b which are not coupled to the tunnels. In this regard, in the case where the tunnel height H1 becomes small relative to the bead seal height H2, it becomes easy to suppress the increase in the straight portion line pressure. However, in the case where the tunnel height H1 becomes small, the pressure loss of the fluid flowing through the tunnels tend to be large. Therefore, it is preferable to reduce the tunnel height H1 as long as the flow of the fluid inside the tunnels is not compromised.

As shown in FIG. 2, the terminal plates 18a, 18b are made of electrically conductive material. For example, the terminal plates 18a, 18b are made of metal such as copper, aluminum, or stainless steel. Terminal units 120 (FIG. 1) are provided at substantially the centers of the terminal plates 18a, 18b. The terminal units 120 extend outward in the stacking direction. As shown in FIG. 1, the terminal units 120 are inserted into through holes (not shown) provided in the insulators 20a, 20b and the end plates 22a, 22b, and protrude outside the end plates 22a, 22b in the stacking direction.

As shown in FIG. 2 the insulators 20a, 20b are made of insulating material such as polycarbonate (PC), phenol resin, etc. Insulator recesses 122a, 122b are formed at the centers of the insulators 20a, 20b. The insulator recesses 122a, 122b are opened toward the stack body 16. A terminal plate 18a is accommodated in the insulator recess 122a, and a terminal plate 18b is accommodated in the insulator recess 122b.

Operation of the fuel cell stack 14 (FIG. 1) having the above structure will be described briefly. As shown in FIG. 1, in the case of performing power generation in the fuel cell stack 14, a fuel gas is supplied to the fuel gas supply passage 48a, an oxygen-containing gas is supplied to the oxygen-containing gas supply passage 44a, and a coolant is supplied to the coolant supply passages 46a.

As shown in FIG. 4, the oxygen-containing gas flows from the oxygen-containing gas supply passage 44a into the oxygen-containing gas flow field 52 through the oxygen-containing gas bridge section 90, the oxygen-containing gas moves along the oxygen-containing gas flow field 52 in the direction indicated by the arrow B, and the oxygen-containing gas is supplied to the cathode 42 of the membrane electrode assembly 34. In the meanwhile, as shown in FIG. 5, the fuel gas flows from the fuel gas supply passage 48a into the fuel gas flow field 58 through the fuel gas bridge section 92, moves along the fuel gas flow field 58 in the direction indicated by the arrow B, and the fuel gas is supplied to the anode 40 of the membrane electrode assembly 34.

Thus, in each of the membrane electrode assemblies 34, the oxygen-containing gas supplied to the cathode 42 and the fuel gas supplied to the anode 40 are partially consumed in electrochemical reactions in the cathode catalyst layer 42a and the anode catalyst layer 40a to perform power generation.

Then, the remaining oxygen-containing gas which has not been consumed in the electrochemical reaction (oxygen-containing exhaust gas) flows from the oxygen-containing gas flow field 52 into each of the oxygen-containing gas discharge passages 44b through the oxygen-containing gas bridge section 90, and the oxygen-containing gas is discharged along the oxygen-containing gas discharge passages 44b of the stack body 16 in the direction indicated by the arrow A. Likewise, the remaining fuel gas which has not been consumed in the electrochemical reaction (fuel exhaust gas) flows from the fuel gas flow field 58 into each of the fuel gas discharge passages 48b through the fuel gas bridge section 92, and the fuel gas is discharged along the fuel gas discharge passages 48b of the stack body 16 in the direction indicated by the arrow A.

As shown in FIG. 6, the coolant flows from each of the coolant supply passages 46a into the coolant flow field 60 through the coolant bridge section 94, and the coolant moves along the coolant flow field 60 in the direction indicated by the arrow B, for performing heat exchange with the membrane electrode assembly 34. The coolant after heat exchange flows through the coolant bridge section 94 into each of the coolant discharge passages 46b, and the coolant is discharged along the coolant discharge passages 46b of the stack body 16.

In the fuel cell joint separator 10 according to the embodiment of the present invention, as described above, the tunnel height H1 is determined to be smaller than the bead seal height H2 by not less than the predetermined value in a manner that the straight portion line pressure becomes the same as the curved portion line pressure. In the passage bead seals 74a, 74b having this structure, though the straight portions 75a are coupled to the tunnels, it is possible to avoid the situations where the straight portion line pressure at each position does not become locally higher than the curved portion line pressure of the portions which are not coupled to the tunnels such as the curved portions 75b. In the structure, it is possible to apply the pressure to each of the front end surfaces of the passage bead seals 74a, 74b uniformly.

Further, in this case, increase in the rigidity of each of the straight portions 75a of the passage bead seals 74a, 74b is suppressed. Therefore, it is possible to suitably and elastically deform the straight portion 75a in correspondence with the compression load, and it is possible to suppress buckling of the straight portion 75a. As a result, it is possible to suitably maintain the state where the line pressure having the predetermined strength is applied to each of the front end surfaces of the passage bead seals 74a, 74b.

Therefore, in the fuel cell joint separator 10 and the power generation cell 12 including the fuel cell joint separator 10, it is possible to suitably achieve the seal performance by the passage bead seals 74a, 74b.

In this regard, the relationship among the tunnel height H1 relative to the bead seal height H2, the load in a compression direction (indicated by the arrow A) applied to the passage bead seal 74a (or the passage bead seal 74b) of one fuel cell joint separator 10, and the line pressure applied to the front end surface of the passage bead seal 74a will be described with reference to FIG. 11.

Figure 11:
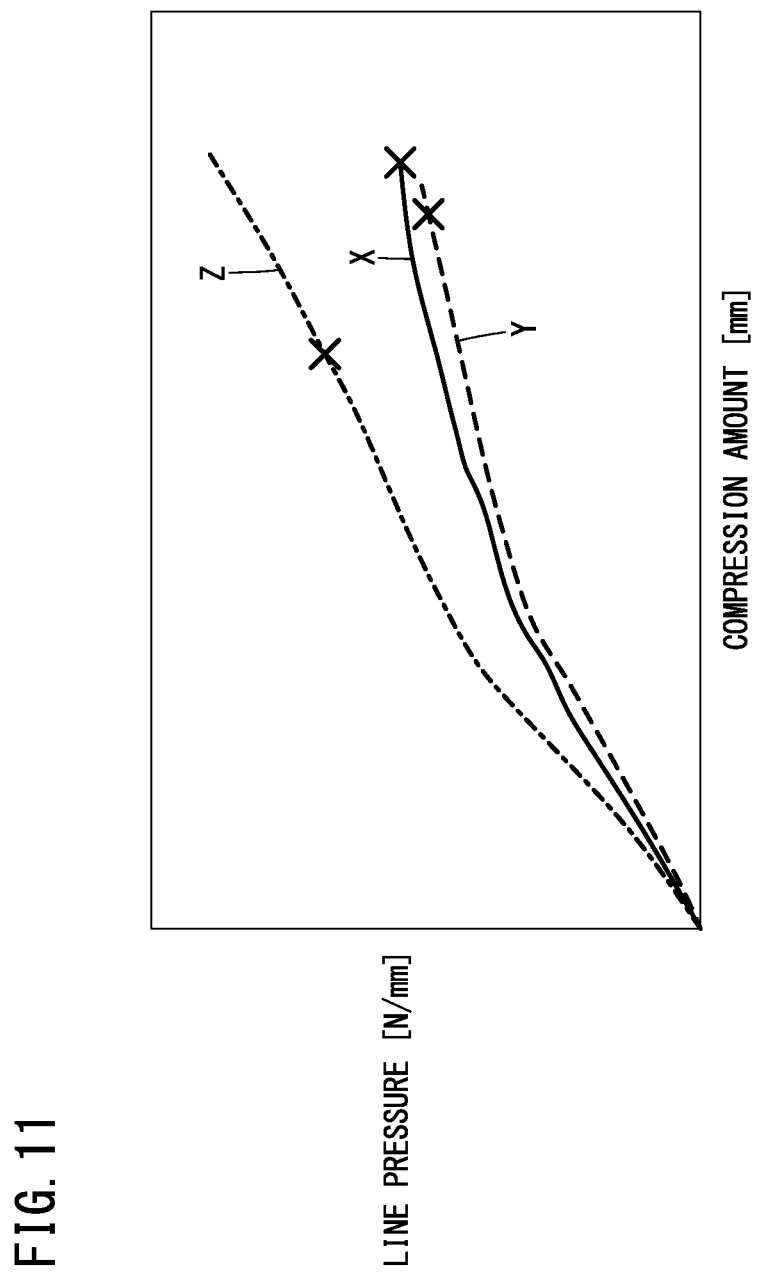
FIG. 11 is a graph showing the relationship between the compression quantity and the line pressure of each of a curved portion, a straight portion according to an embodiment, and a straight portion according to a comparative example.

The horizontal axis in FIG. 11 represents, as a value of the compression amount corresponding to the load in the compression direction by which the passage bead seal 74a (or the passage bead seal 74b) is deformed in the stacking direction. Further, the vertical axis in FIG. 11 represents the line pressure of the above passage bead seal 74a (or the passage bead seal 74b).

The graph shown by a solid line X in FIG. 11 shows the relationship between the compression amount and the line pressure in each of the curved portions 75b of the passage bead seal 74a (or the passage bead seal 74b). It should be noted that, though not shown in the graph, the line pressure of each of the curved portions 75b is slightly larger than the line pressure of the straight portions which are not coupled to the tunnels of the passage bead seals 74a, 74b.

The graph shown by a broken line Y in FIG. 11 shows the relationship between the compression amount and the line pressure in each of the straight portions 75a of the passage bead seal 74a (or the passage bead seal 74b). That is, FIG. 11 shows the relationship between the compression amount and the line pressure in the straight portion 75a in the case where the tunnel height H1 is 50% of the bead seal height (in the case where the tunnel height H1 is smaller than the bead seal height H2 by not less than the predetermined value).

The graph shown by a one dot chain line Z in FIG. 11 shows the relationship between the compression amount in the straight portion 75a of the passage bead seal 74a (or the passage bead seal 74b) and the line pressure according to a comparative example. Specifically, FIG. 11 shows the relationship between the compression amount and the line pressure in the straight portion 75a in the case where the tunnel height H1 is 70% of the bead seal height H2 (in the case where the tunnel height H1 is not smaller than the bead seal height H2 by not less than the predetermined value, i.e., where the tunnel height H1 is smaller than the bead seal height H2 and the difference therebetween is less than the predetermined value).

As can be seen from the graph of FIG. 11, in the case where the tunnel height H1 is smaller than bead seal height H2 by not less than a predetermined value, the line pressure of the straight portion 75a is kept within the range between 80% and 120% of the line pressure of the curved portion 75b. That is, since it is possible to maintain the state where variation of the line pressure of the passage bead seal 74a (or the passage bead seal 74b) falls within the range of ±20%, it is possible to obtain excellent sealing characteristics. In the graph of FIG. 11, the line pressure of the straight portion 75a is set to be not more than the line pressure of the curved portion 75b.

It should be noted that variation of the line pressure of the passage bead seals 74a, 74b in the direction in which the passage bead seals 74a, 74b extend is within ±30%, and more preferably, within ±20%. In this manner, it is possible to effectively eliminate or reduce the situations where the passage bead seals 74a, 74b have portions in which the line pressure becomes large to the extent that buckling of the passage bead seals 74a, 74b tends to occur, and portions in which the line pressure becomes small to the extent that the desired seal performance cannot be exerted sufficiently.

On the other hand, in the case where the tunnel height H1 is not smaller than the bead seal height H2 by not less than the predetermined value, it can be seen that the line pressure of the straight portion 75a becomes higher than 120% of the line pressure of the curved portion 75b. That is, the line pressure of the passage bead seal 74a (or the passage bead seal 74b) may vary beyond the range of ±20%.

Further, the cross mark (X) in FIG. 11 shows the compression amount at which buckling of the straight portion 75a occurs. It can be seen from this cross mark (X) that in the case where the tunnel height H1 is smaller than the bead seal height H2 by not less than a predetermined value, in comparison with case where the tunnel height H1 is not smaller than the bead seal height H2 by not less than a predetermined value, buckling does not occur easily.

Therefore, as can be clearly seen from FIG. 11, by determining the suitable tunnel height H1 relative to the bead seal height H2, it is possible to avoid the situations where the line pressure applied to the front end surface of the straight portion 75a becomes locally and significantly higher than the line pressure applied to the front end surface of the curved portion 75b, etc. Further, even if the compression amount becomes large, it is possible to suppress buckling of the straight portion 75a. In this manner, it is possible to apply the line pressure to the front end surfaces of the passage bead seals 74a, 74b uniformly, and maintain the suitable strength of the line pressure at which the desired seal performance of the passage bead seals 74a, 74b is exerted. As described above, in the fuel cell joint separator 10 and the power generation cell 12 including the fuel cell joint separator 10 according to the embodiment of the present invention, it is possible to achieve the desired seal performance of the passage bead seals 74a, 74b.

In the fuel cell joint separator 10 according to the embodiment of the present invention, the protruding height of the tunnel (tunnel height H1) is determined to be not more than 50% of the protruding height of the passage bead seals 74a, 74b (bead seal height H2). In this case, it is possible to apply the line pressure to the front end surface of the passage bead seals 74a, 74b uniformly. Also, by suppressing buckling of the straight portion 75a, it is possible to suitably maintain the state where the line pressure having the predetermined strength is applied to the front end surfaces of the passage bead seals 74a, 74b.

In the fuel cell joint separator 10 according to the embodiment of the present invention, as the tunnel, the bridge section (oxygen-containing gas bridge section 90 and the fuel gas bridge section 92) includes a plurality of inner tunnels 100 coupled to the inner side wall 75c of the straight portion 75a of the passage bead seal 74a, 74b, and a plurality of outer tunnels 102 coupled to the outer side wall 75d of the straight portion 75a of the passage bead seal 74a, 74b, and the plurality of inner tunnels 100 and the plurality of outer tunnels 102 are disposed in a zigzag pattern with respect to the passage bead seal 74a, 74b.

In this case, it is possible to suitably distribute the oxygen-containing gas which flowed from the oxygen-containing gas supply passage 44a into the inner tunnels 100 and the outer tunnels 102 toward the oxygen-containing gas flow field 52. Further, it is possible to suitably distribute the fuel gas which flowed from the fuel gas supply passage 48a into the inner tunnels 100 and the outer tunnels 102 toward the fuel gas flow field 58. In this manner, it is possible to improve the power generation characteristics of the fuel cell stack 14. Further, since positions of the inner tunnels 100 and the outer tunnels 102 are shifted as described above, it is possible to apply the line pressure to the front end surfaces of the passage bead seals 74a, 74b more uniformly.

The fuel cell joint separator 10 according to the embodiment of the present invention further includes the inner bead seal 72a, 72b protruding in the separator thickness direction, the inner bead seal 72a, 72b including the facing portion 86a, 86b facing the outer side wall 75d of the straight portion 75a of the passage bead seal 74a, 74b at a distance, wherein the bridge section (coolant bridge section 94) is disposed in the facing portion 86a, 86b, the facing portion 86a, 86b includes the first side wall 87a positioned on a side closer to the outer side wall 75d of the straight portion 75a, and the second side wall 87b positioned opposite to the side closer to the straight portion 75a, as the tunnel, the bridge section (coolant bridge section 94) includes the plurality of inner tunnels 100 coupled to the inner side wall 75c of the straight portion 75a and the plurality of outer tunnels 104 each having one end coupled to the outer side wall 75d of the straight portion 75a, and the other end coupled to the first side wall 87a of the facing portion 86a, 86b, and further includes the plurality of outermost tunnels 106 coupled to the second side wall 87b of the facing portion 86a, 86b.

That is, even in the case where, as viewed in the thickness direction of the fuel cell joint separator 10, the coolant flow field 60 is disposed inside the portions surrounded by the inner bead seals 72a, 72b, and the coolant passages 46a, 46b are disposed outside these portion, it is possible to suitably connect the coolant flow field 60 and the coolant passages 46a, 46b through the coolant bridge section 94. At this time, since the tunnel height H1 relative to the bead seal height H2 is determined as described above, it is possible to apply the pressure to the front end surfaces of the passage bead seals 74a, 74b uniformly, and maintain the state where the suitable line pressure is applied to the front end surfaces of the passage bead seals 74a, 74b. Moreover, it is possible to achieve the desired seal performance by the passage bead seals 74a, 74b.

In the fuel cell joint separator 10 according to the above embodiment, the plurality of inner tunnels 100 and the plurality of outer tunnels 104 are disposed in a zigzag pattern with respect to the passage bead seal 74a, 74b, and the plurality of outer tunnels 104 and the plurality of outermost tunnels 106 are disposed in a zigzag pattern with respect to the inner bead seal 72a, 72b.

In this case, it is possible to suitably distribute the coolant which flowed from the coolant supply passages 46a into the inner tunnels 100, the outer tunnels 104, and the outermost tunnels 106 toward the coolant flow field 60, it is possible to effectively perform heat exchange between the coolant and the power generation cells 12, and moreover, improve the power generation characteristics by the fuel cell stack 14. Further, as described above, since the positions the inner tunnels 100, the outer tunnels 104, and the outermost tunnels 106 are shifted, it is possible to apply the line pressure to the front end surfaces of the passage bead seals 74a, 74b more uniformly.

The present invention is not limited to the above described embodiments. Various modifications may be made without departing from the gist of the present invention.

What is claimed is:

1. A fuel cell separator comprising:
a fluid flow field as a passage of fluid comprising an oxygen-containing gas, a fuel gas, or a coolant in a separator surface direction;
a fluid passage connected to the fluid flow field and penetrating through the fuel cell separator in a separator thickness direction; and
a passage bead seal formed around the fluid passage, and protruding in the separator thickness direction,
wherein the fuel cell separator is stacked on a membrane electrode assembly, and a compression load is applied to the fuel cell separator in the stacking direction,
the fuel cell separator further comprises a bridge section configured to connect inside and outside of a portion surrounded by the passage bead seal, as viewed in the separator thickness direction,
the passage bead seal includes a straight portion where the bridge section is disposed, and curved portions provided on both sides of the straight portion in a peripheral direction of the passage bead seal,
the bridge section includes a tunnel coupled to a side wall of the straight portion, and protruding in the separator thickness direction, and
a protruding height of the tunnel by which the tunnel protrudes from a reference surface is determined to be smaller than a protruding height of the passage bead seal by which the passage bead seal protrudes from the reference surface, by not less than a predetermined value, in a manner that a line pressure applied by the compression load to a front end surface of the straight portion in a protruding direction becomes same as a line pressure applied by the compression load to a front end surface of the curved portion in a protruding direction.

2. The fuel cell separator according to claim 1, wherein the protruding height of the tunnel is determined to be not more than 50% of the protruding height of the passage bead seal.

3. The fuel cell separator according to claim 1, wherein as the tunnel, the bridge section includes a plurality of inner tunnels coupled to an inner side wall of the straight portion of the passage bead seal, and a plurality of outer tunnels coupled to an outer side wall of the straight portion of the passage bead seal, and
the plurality of inner tunnels and the plurality of outer tunnels are disposed in a zigzag pattern with respect to the passage bead seal.

4. The fuel cell separator according to claim 1, further comprising an inner bead seal protruding in the separator thickness direction, the inner bead seal including a facing portion facing an outer side wall of the straight portion of the passage bead seal at a distance, wherein the bridge section is disposed in the facing portion,
the facing portion includes a first side wall positioned on a side closer to the outer side wall of the straight portion, and a second side wall positioned opposite to the side closer to the straight portion,
as the tunnel, the bridge section comprises a plurality of inner tunnels coupled to an inner side wall of the straight portion and a plurality of outer tunnels each having one end coupled to the outer side wall of the straight portion, and another end coupled to the first side wall of the facing portion, and further comprises a plurality of outermost tunnels coupled to the second side wall of the facing portion.

5. The fuel cell separator according to claim 4, wherein the plurality of inner tunnels and the plurality of outer tunnels are disposed in a zigzag pattern with respect to the passage bead seal, and
the plurality of the outer tunnels and the plurality of the outermost tunnels are disposed in a zigzag pattern with respect to the inner bead seal.

6. A power generation cell comprising a fuel cell separator and a membrane electrode assembly,
the fuel cell separator comprising:
a fluid flow field as a passage of fluid comprising an oxygen-containing gas, a fuel gas, or a coolant in a separator surface direction;
a fluid passage connected to the fluid flow field and penetrating through the fuel cell separator in a separator thickness direction; and
a passage bead seal formed around the fluid passage, and protruding in the separator thickness direction,
wherein the fuel cell separator is stacked on the membrane electrode assembly, and a compression load is applied to the fuel cell separator in the stacking direction, the fuel cell separator further comprises a bridge section configured to connect inside and outside of a portion surrounded by the passage bead seal, as viewed in the separator thickness direction, the passage bead seal includes a straight portion where the bridge section is disposed, and curved portions provided on both sides of the straight portion in a peripheral direction of the passage bead seal, the bridge section includes a tunnel coupled to a side wall of the straight portion, and protruding in the separator thickness direction, and a protruding height of the tunnel by which the tunnel protrudes from a reference surface is determined to be smaller than a protruding height of the passage bead seal by which the passage bead seal protrudes from the reference surface, by not less than a predetermined value, in a manner that a line pressure applied by the compression load to a front end surface of the straight portion in a protruding direction becomes same as a line pressure applied by the compression load to a front end surface of the curved portion in a protruding direction.

\* \* \* \* \*